United States Patent
Imaoka

(10) Patent No.: US 9,835,932 B2
(45) Date of Patent: Dec. 5, 2017

(54) ZOOM LENS SYSTEM, INTERCHANGEABLE LENS DEVICE, AND CAMERA SYSTEM

(71) Applicant: Panasonic Intellectual Property Management Co., Ltd., Osaka (JP)

(72) Inventor: Takuya Imaoka, Kanagawa (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 35 days.

(21) Appl. No.: 14/996,501

(22) Filed: Jan. 15, 2016

(65) Prior Publication Data
US 2016/0209632 A1  Jul. 21, 2016

(30) Foreign Application Priority Data

Jan. 21, 2015 (JP) ................................ 2015-009845
Dec. 22, 2015 (JP) ................................ 2015-250129

(51) Int. Cl.
| | | |
|---|---|---|
| G03B 7/20 | (2006.01) | |
| G02B 15/177 | (2006.01) | |
| G02B 15/22 | (2006.01) | |
| G02B 15/16 | (2006.01) | |
| G02B 15/15 | (2006.01) | |
| G02B 15/20 | (2006.01) | |
| G02B 13/00 | (2006.01) | |

(52) U.S. Cl.
CPC ............. *G03B 7/20* (2013.01); *G02B 13/009* (2013.01); *G02B 15/155* (2013.01); *G02B 15/161* (2013.01); *G02B 15/177* (2013.01); *G02B 15/20* (2013.01); *G02B 15/22* (2013.01)

(58) Field of Classification Search
None
See application file for complete search history.

(56) References Cited

U.S. PATENT DOCUMENTS

| | | | |
|---|---|---|---|
| 6,307,685 B1 | 10/2001 | Mori et al. | |
| 8,625,202 B2 * | 1/2014 | Yoshinaga | G02B 15/173 359/676 |

(Continued)

FOREIGN PATENT DOCUMENTS

| | | |
|---|---|---|
| JP | 62-206516 | 9/1987 |
| JP | 11-142733 | 5/1999 |

(Continued)

*Primary Examiner* — Thomas K Pham
*Assistant Examiner* — Mitchell Oestreich
(74) *Attorney, Agent, or Firm* — Wenderoth, Lind & Ponack, L.L.P.

(57) ABSTRACT

A zoom lens system according to the present disclosure includes a plurality of lens groups each of which is made up of at least one lens element. The zoom lens system includes, in order from an object side to an image side: a first focusing lens group having a negative power; and a second focusing lens group having a positive power, wherein when zooming is performed from a wide end to a telephoto end, the first focusing lens group and the second focusing lens group move along an optical axis, when focusing is performed from an infinity focusing state to a proximity object focusing state, the first focusing lens group and the second focusing lens group move to perform the focusing, and a predetermined condition is satisfied.

19 Claims, 49 Drawing Sheets

(56) References Cited

U.S. PATENT DOCUMENTS

| | | | |
|---|---|---|---|
| 2010/0284092 A1* | 11/2010 | Hayakawa | G02B 15/173 359/683 |
| 2011/0228160 A1* | 9/2011 | Imaoka | G02B 15/173 348/345 |
| 2013/0120640 A1 | 5/2013 | Taki | |
| 2014/0085531 A1* | 3/2014 | Yamano | G02B 15/173 348/347 |
| 2014/0184887 A1* | 7/2014 | Yonetani | G02B 13/0015 348/349 |
| 2014/0240554 A1 | 8/2014 | Uchida et al. | |

FOREIGN PATENT DOCUMENTS

| | | |
|---|---|---|
| JP | 2013-105131 | 5/2013 |
| JP | 2014-157225 | 8/2014 |
| JP | 2014-186306 | 10/2014 |

\* cited by examiner

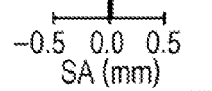
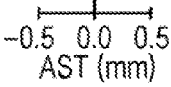
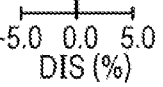

FIG. 6A
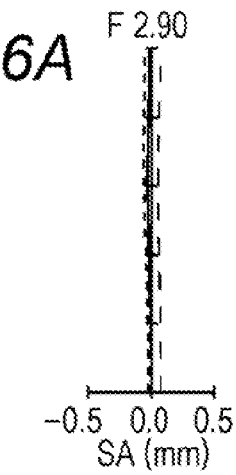 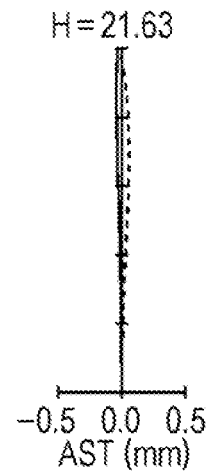 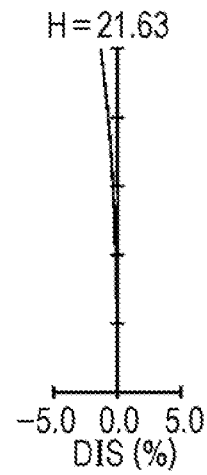
FIG. 6B
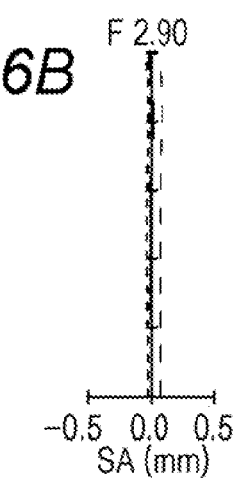 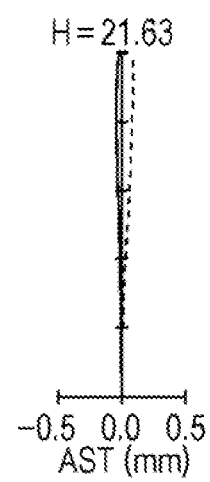 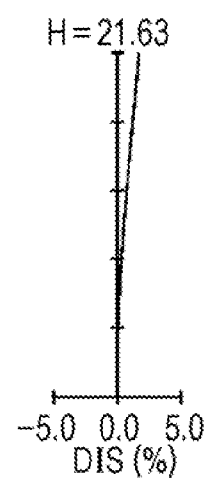
FIG. 6C
 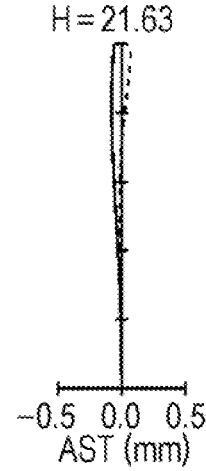 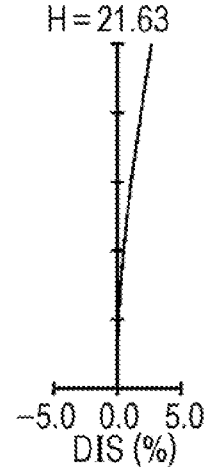

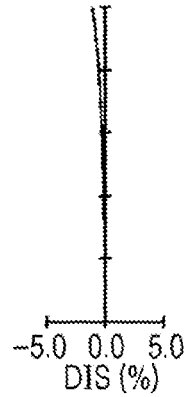
FIG. 7A
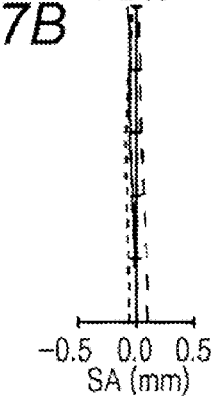
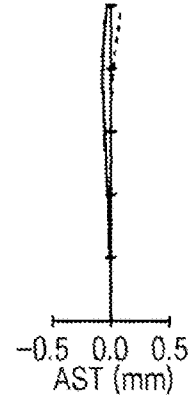
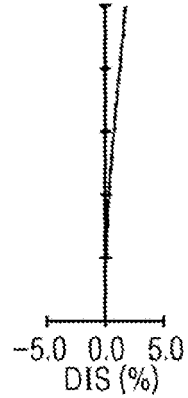
FIG. 7B
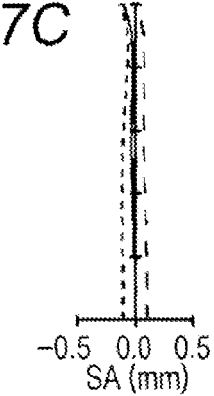
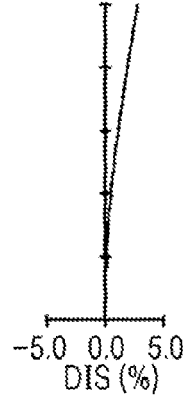
FIG. 7C FIG. 10A 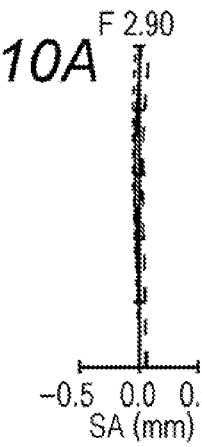 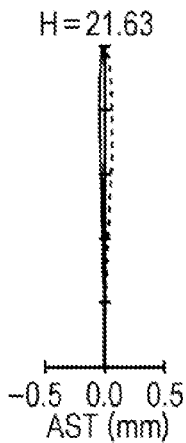 
FIG. 10B 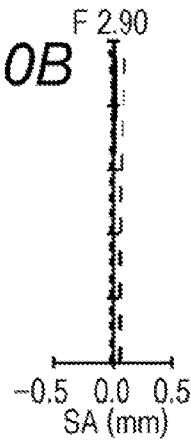 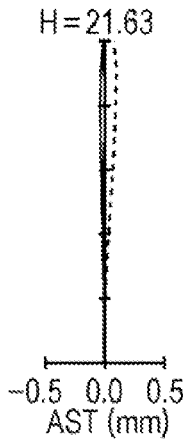 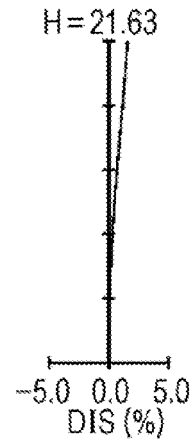
FIG. 10C 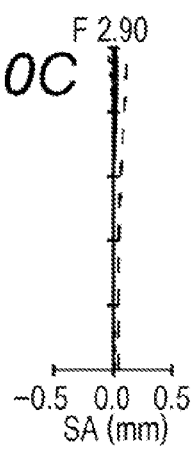 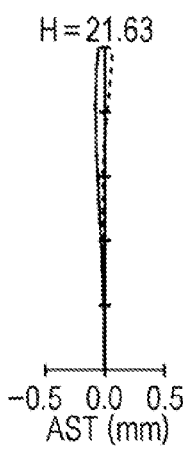 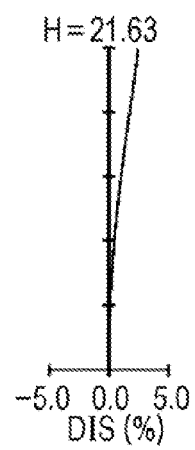

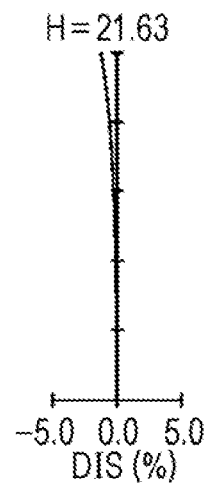
FIG. 11A
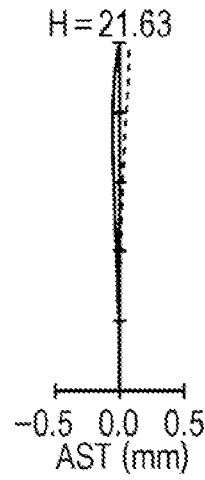
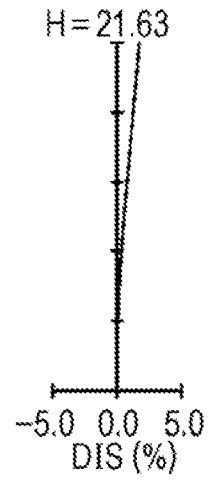
FIG. 11B
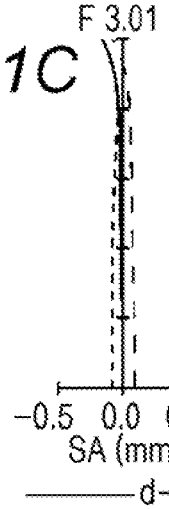
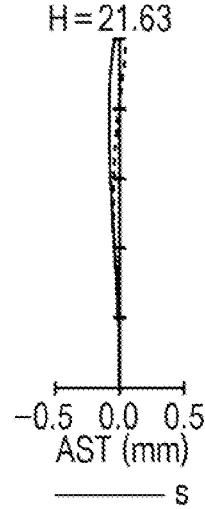
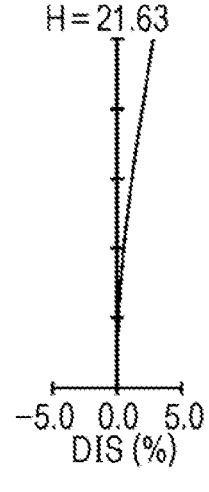
FIG. 11C FIG. 14A 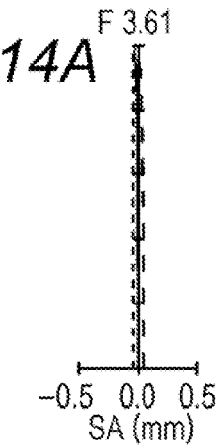 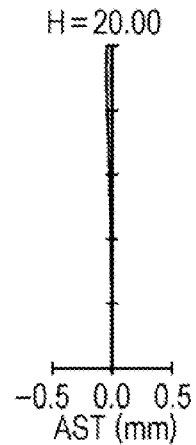 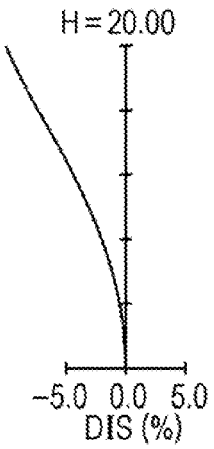
FIG. 14B 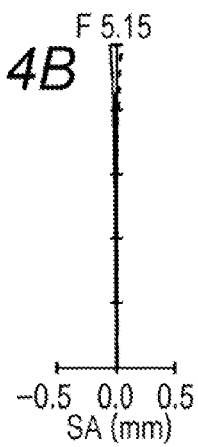 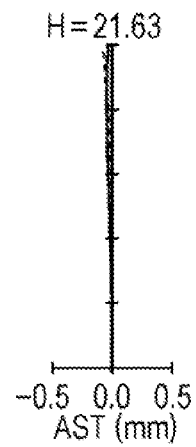 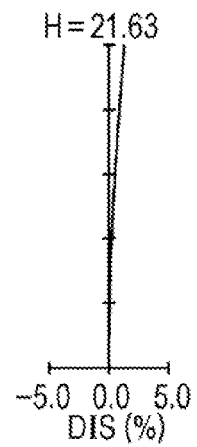
FIG. 14C 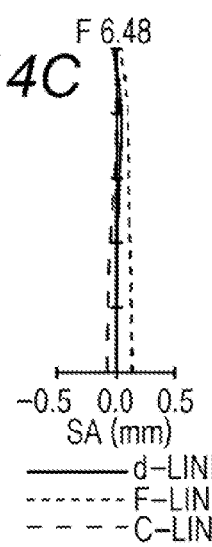 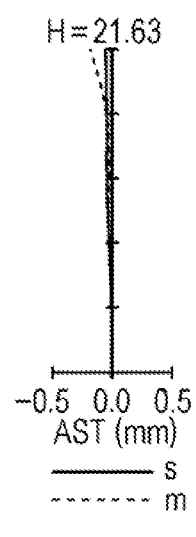 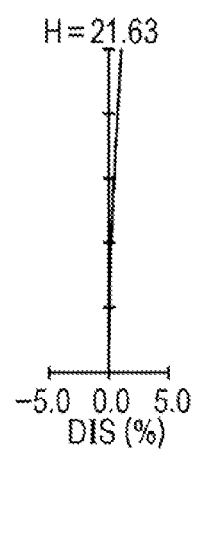

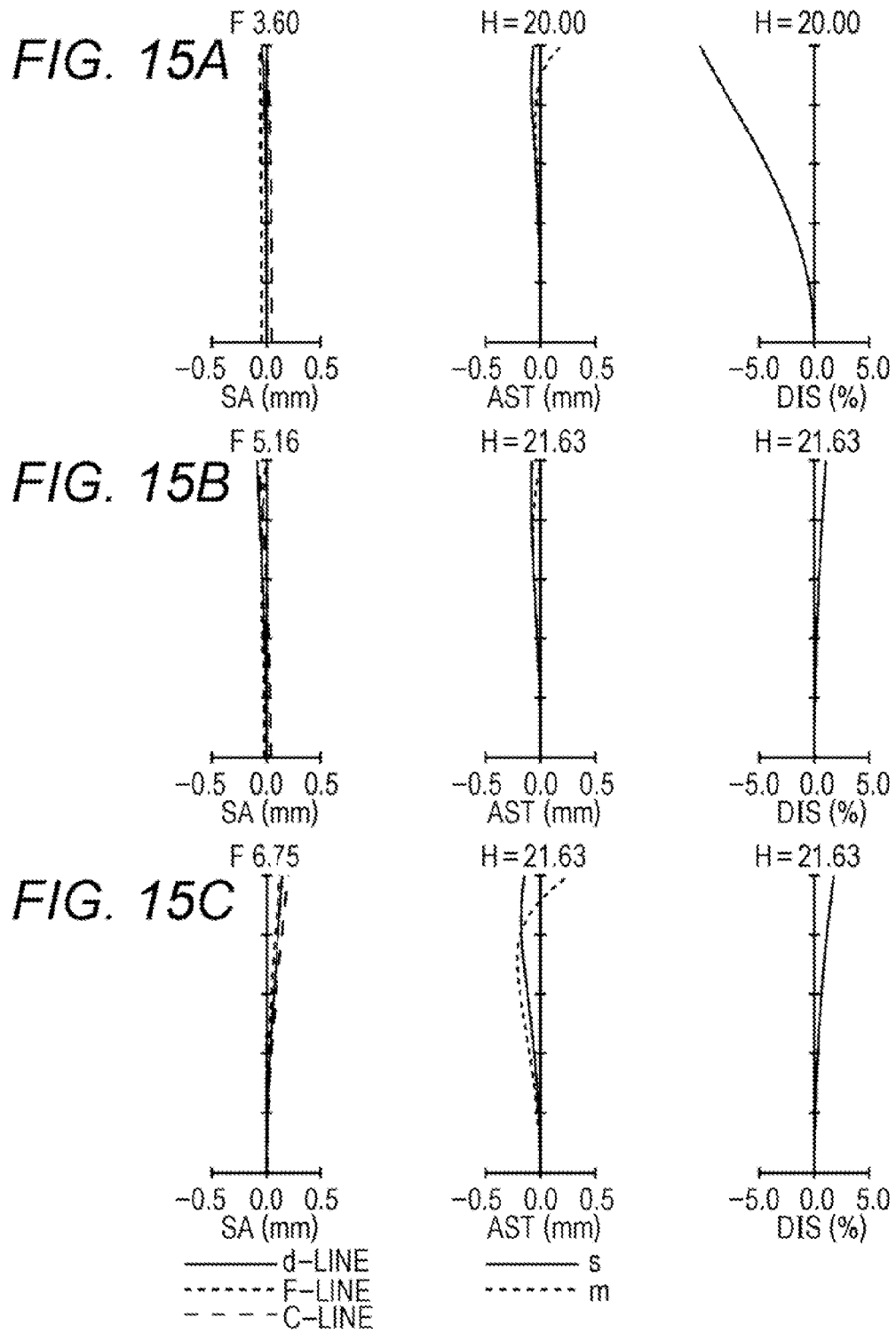

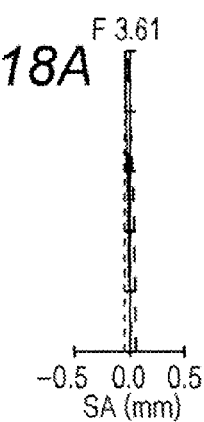
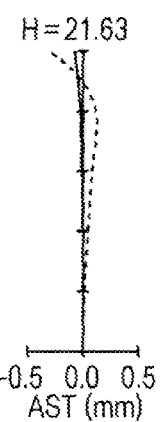
FIG. 18A
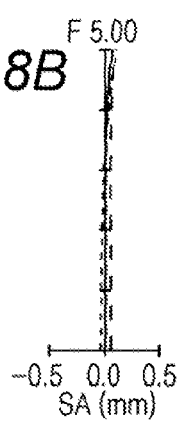
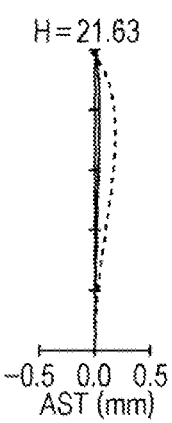
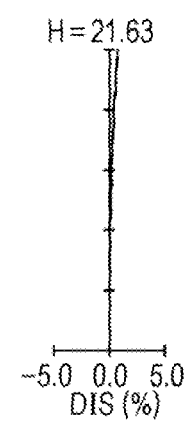
FIG. 18B
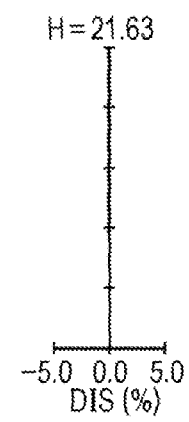
FIG. 18C

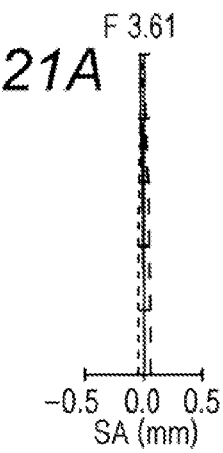
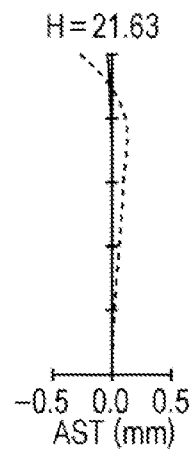
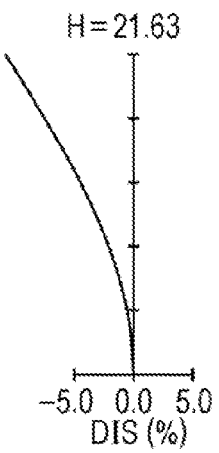
FIG. 21A
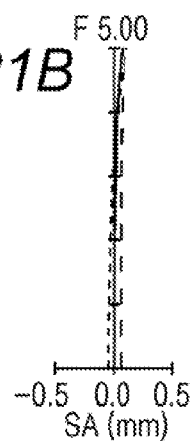
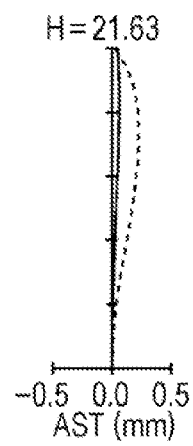
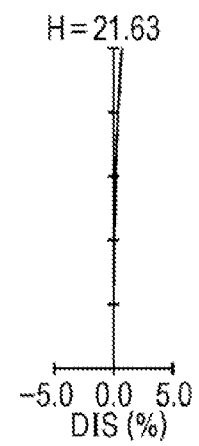
FIG. 21B
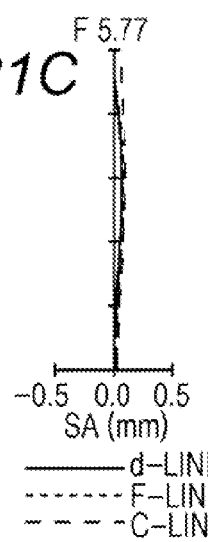
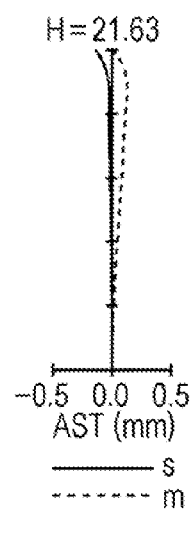
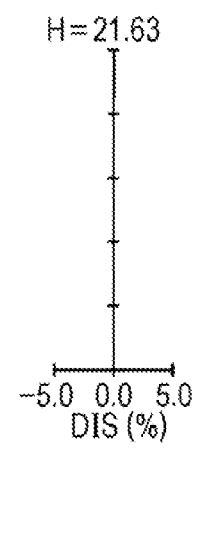
FIG. 21C

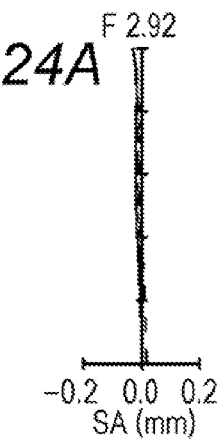
FIG. 24A
FIG. 24B
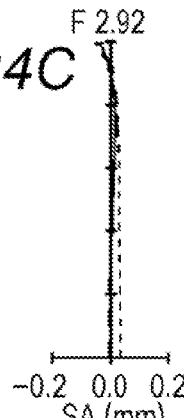
FIG. 24C
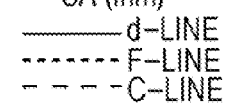
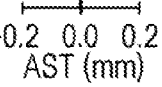
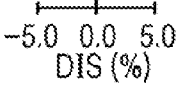

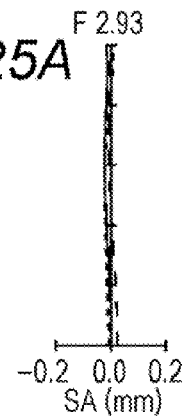 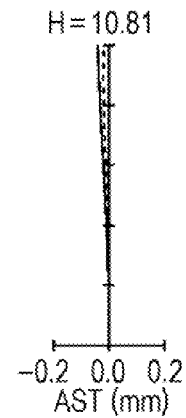 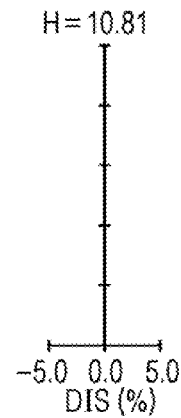
FIG. 25A
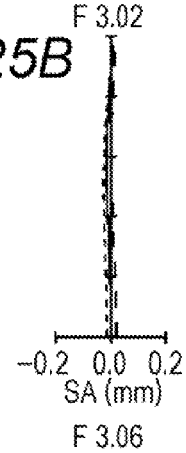 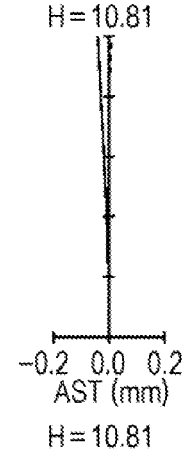 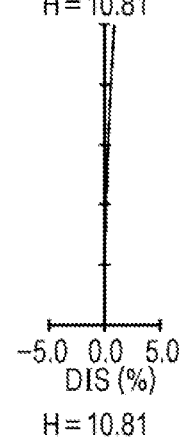
FIG. 25B
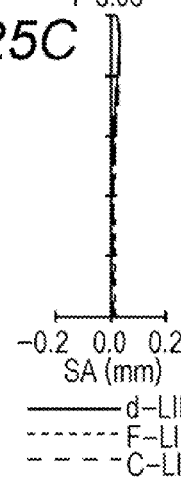 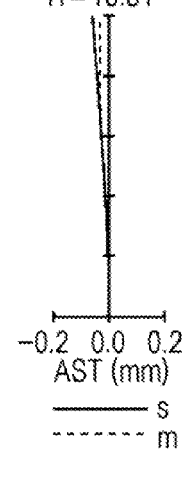 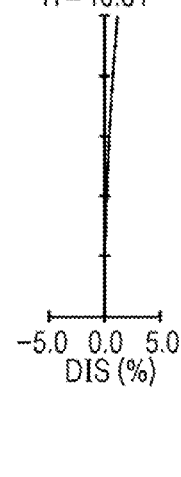
FIG. 25C

*FIG. 28*

| SURFACE NUMBER | r | d | nd | vd |
|---|---|---|---|---|
| OBJECT PLANE | ∞ | | | |
| 1 | 178.66790 | 2.40000 | 1.90366 | 31.3 |
| 2 | 88.73070 | 1.02470 | | |
| 3 | 88.73070 | 9.67830 | 1.43700 | 95.1 |
| 4 | -590.40040 | 0.20000 | | |
| 5 | 88.40080 | 8.28890 | 1.43700 | 95.1 |
| 6 | -1630.19590 | VARIABLE | | |
| 7 | 293.10870 | 4.05020 | 1.84666 | 23.8 |
| 8 | -307.24960 | 2.21160 | | |
| 9 | 246.30560 | 1.80000 | 1.59349 | 67.0 |
| 10 | 55.02840 | 3.03610 | 1.69895 | 30.0 |
| 11 | 90.90590 | 2.88380 | | |
| 12 | 2761.15140 | 1.60000 | 1.59349 | 67.0 |
| 13 | 106.44040 | 5.78450 | | |
| 14 | -70.13620 | 1.50000 | 1.72916 | 54.7 |
| 15 | 76.00610 | 2.23850 | 1.78472 | 25.7 |
| 16 | 158.63790 | VARIABLE | | |
| 17 | 70.89880 | 6.45930 | 1.83481 | 42.7 |
| 18 | -183.85220 | VARIABLE | | |
| 19 | 44.71190 | 4.32610 | 1.43700 | 95.1 |
| 20 | 108.24170 | 5.49810 | | |
| 21 (DIAPHRAGM) | ∞ | 2.50000 | | |
| 22 | 346.10340 | 3.74600 | 1.49700 | 81.6 |
| 23 | -68.32480 | 1.30000 | 2.00100 | 29.1 |
| 24 | 40.83250 | 2.58620 | | |
| 25 | 69.59730 | 1.30000 | 1.80610 | 33.3 |
| 26 | 42.15810 | 6.59070 | 1.48749 | 70.4 |
| 27 | -83.40530 | 0.20000 | | |
| 28 | 77.87690 | 3.57650 | 1.71300 | 53.9 |
| 29 | -257.08570 | 1.35690 | | |
| 30 | ∞ | 5.04720 | | |
| 31 | -49.64730 | 1.30000 | 1.51823 | 59.0 |
| 32 | 36.36000 | 7.92230 | 1.62041 | 60.3 |
| 33 | -48.73690 | VARIABLE | | |
| 34 | -149.83270 | 2.73050 | 1.80518 | 25.5 |
| 35 | -41.70390 | 0.80000 | 1.58144 | 40.9 |
| 36 | 38.56360 | VARIABLE | | |
| 37 | 143.61370 | 4.64160 | 1.84666 | 23.8 |
| 38 | -81.00210 | VARIABLE | | |
| 39 | -65.44990 | 1.50000 | 1.72342 | 38.0 |
| 40 | 48.76690 | 3.09120 | | |
| 41 | 45.26650 | 8.21380 | 1.62041 | 60.3 |
| 42 | ∞ | 31.01840 | | |
| IMAGE PLANE | ∞ | | | |

FIG. 29

| ZOOM RATIO | 2.95713 | | |
|---|---|---|---|
| | WIDE | MEDIUM | TELE |
| FOCAL LENGTH | 92.2864 | 158.6671 | 272.9028 |
| F-NUMBER | 2.9076 | 3.2845 | 4.1055 |
| ANGLE OF VIEW | 13.1946 | 7.6150 | 4.4177 |
| IMAGE HEIGHT | 21.6300 | 21.6300 | 21.6300 |
| d6 | 1.1675 | 29.0997 | 53.3278 |
| d16 | 61.1833 | 29.6605 | 1.0000 |
| d18 | 1.0000 | 4.5905 | 9.0230 |
| d33 | 2.5391 | 6.8311 | 2.5000 |
| d36 | 23.6362 | 24.1859 | 34.8950 |
| d38 | 14.0722 | 9.2305 | 2.8526 |

FIG. 30

| GROUP | START SURFACE | FOCAL LENGTH |
|---|---|---|
| 1 | 1 | 172.45338 |
| 2 | 7 | -59.93162 |
| 3 | 17 | 62.00739 |
| 4 | 19 | 148.56478 |
| 5 | 34 | -65.94136 |
| 6 | 37 | 61.75545 |
| 7 | 39 | -90.17525 |

FIG. 31

| | WIDE | MEDIUM | TELE |
|---|---|---|---|
| OBJECT DISTANCE | 1200.0000 | 1200.0000 | 1200.0000 |
| d6 | 1.1675 | 29.0997 | 53.3278 |
| d16 | 61.1833 | 29.6605 | 1.0000 |
| d18 | 1.0000 | 4.5905 | 9.0230 |
| d33 | 4.3347 | 12.5970 | 19.5673 |
| d36 | 20.6573 | 15.6675 | 12.2099 |
| d38 | 15.2555 | 11.9830 | 8.4703 |

FIG. 32

| SURFACE NUMBER | r | d | nd | vd |
|---|---|---|---|---|
| OBJECT PLANE | ∞ | | | |
| 1 | 127.28940 | 2.00000 | 1.84666 | 23.8 |
| 2 | 75.68600 | 9.84220 | 1.49700 | 81.6 |
| 3 | 591.32420 | 0.20000 | | |
| 4 | 95.83010 | 7.80840 | 1.49700 | 81.6 |
| 5 | 4810.63100 | VARIABLE | | |
| 6 | 406.78590 | 2.00000 | 1.61800 | 63.4 |
| 7 | 40.71820 | 10.19880 | | |
| 8 | -89.70220 | 3.09740 | 1.84666 | 23.8 |
| 9 | -53.56930 | 1.47370 | | |
| 10 | -49.30490 | 1.50000 | 1.69680 | 55.5 |
| 11 | 1219.95860 | 0.10000 | | |
| 12 | 86.20020 | 3.89380 | 1.84666 | 23.8 |
| 13 | 426.99000 | VARIABLE | | |
| 14 | 82.42500 | 6.74770 | 1.72916 | 54.7 |
| 15 | -216.68920 | VARIABLE | | |
| 16 | 51.93320 | 3.03920 | 1.72916 | 54.7 |
| 17 | 100.28070 | 5.23110 | | |
| 18 (DIAPHRAGM) | ∞ | 3.18540 | | |
| 19 | -195.70310 | 1.30000 | 1.80610 | 33.3 |
| 20 | 37.44250 | 3.41120 | | |
| 21 | 97.22280 | 1.30000 | 1.80518 | 25.5 |
| 22 | 45.62660 | 5.58430 | 1.59349 | 67.0 |
| 23 | -139.81330 | 0.20000 | | |
| 24 | 77.07170 | 3.64640 | 1.72916 | 54.7 |
| 25 | -269.26660 | 3.06900 | | |
| 26 | -70.29040 | 1.30000 | 1.60342 | 38.0 |
| 27 | 28.51900 | 9.61420 | 1.69680 | 55.5 |
| 28 | -64.57000 | VARIABLE | | |
| 29 | 608.64200 | 3.08720 | 1.84666 | 23.8 |
| 30 | -47.31810 | 0.80000 | 1.74400 | 44.7 |
| 31 | 39.18120 | VARIABLE | | |
| 32 | 86.52460 | 5.55610 | 1.84666 | 23.8 |
| 33 | -83.27500 | VARIABLE | | |
| 34 | -85.44620 | 1.50000 | 1.84666 | 23.8 |
| 35 | 44.34060 | 4.05900 | | |
| 36 | 43.61300 | 8.89190 | 1.54814 | 45.8 |
| 37 | -925.26930 | 31.01840 | | |
| IMAGE PLANE | ∞ | | | |

FIG. 33

| ZOOM RATIO | 2.71571 | | |
|---|---|---|---|
| | WIDE | MEDIUM | TELE |
| FOCAL LENGTH | 71.7986 | 118.2340 | 194.98400 |
| F-NUMBER | 2.9044 | 2.9029 | 2.89938 |
| ANGLE OF VIEW | 16.9789 | 10.1987 | 6.16660 |
| IMAGE HEIGHT | 21.6300 | 21.6300 | 21.63000 |
| d5 | 1.0000 | 24.6664 | 46.39690 |
| d13 | 65.3746 | 31.3898 | 1.00000 |
| d15 | 1.0000 | 11.3183 | 19.97770 |
| d28 | 3.7844 | 5.4532 | 2.50000 |
| d31 | 18.8647 | 21.3479 | 29.46980 |
| d33 | 11.3206 | 7.1685 | 2.00000 |

FIG. 34

| GROUP | START SURFACE | FOCAL LENGTH |
|---|---|---|
| 1 | 1 | 160.73980 |
| 2 | 6 | -72.60365 |
| 3 | 14 | 82.67750 |
| 4 | 16 | 105.47904 |
| 5 | 29 | -65.11249 |
| 6 | 32 | 50.88285 |
| 7 | 34 | -70.01931 |

FIG. 35

| | WIDE | MEDIUM | TELE |
|---|---|---|---|
| OBJECT DISTANCE | 800.0000 | 800.0000 | 800.0000 |
| d5 | 1.0000 | 24.6664 | 46.3969 |
| d13 | 65.3746 | 31.3898 | 1.0000 |
| d15 | 1.0000 | 11.3183 | 19.9777 |
| d28 | 5.6109 | 10.2722 | 14.5214 |
| d31 | 16.2374 | 14.6449 | 13.2963 |
| d33 | 12.1214 | 9.0526 | 6.1520 |

FIG. 36

| SURFACE NUMBER | r | d | nd | vd |
| --- | --- | --- | --- | --- |
| OBJECT PLANE | ∞ | | | |
| 1 | 111.97000 | 2.00000 | 1.846660 | 23.80 |
| 2 | 71.81730 | 9.84930 | 1.497000 | 81.60 |
| 3 | 501.86860 | 0.20000 | | |
| 4 | 96.80530 | 6.95640 | 1.497000 | 81.60 |
| 5 | 1171.36130 | VARIABLE | | |
| 6 | 659.28830 | 2.00000 | 1.618000 | 63.40 |
| 7 | 41.70630 | 9.40220 | | |
| 8 | -98.44380 | 3.07960 | 1.846660 | 23.80 |
| 9 | -55.59200 | 1.43920 | | |
| 10 | -51.10510 | 1.50000 | 1.696800 | 55.50 |
| 11 | 554.35890 | 0.10000 | | |
| 12 | 84.15800 | 3.66770 | 1.846660 | 23.80 |
| 13 | 383.96290 | VARIABLE | | |
| 14 | 80.66220 | 6.71970 | 1.729160 | 54.70 |
| 15 | -178.85550 | VARIABLE | | |
| 16 | 60.05650 | 2.35990 | 1.729160 | 54.70 |
| 17 | 100.84750 | 5.16620 | | |
| 18 (DIAPHRAGM) | ∞ | 3.43330 | | |
| 19 | -141.16450 | 1.30000 | 1.806100 | 33.30 |
| 20 | 41.82640 | 3.12720 | | |
| 21 | 105.49950 | 1.30000 | 1.805180 | 25.50 |
| 22 | 50.15440 | 5.16410 | 1.593490 | 67.00 |
| 23 | -158.64980 | 0.20000 | | |
| 24 | 88.67910 | 3.46330 | 1.729160 | 54.70 |
| 25 | -236.97680 | 2.87510 | | |
| 26 | -77.26210 | 1.30000 | 1.603420 | 38.00 |
| 27 | 30.61410 | 8.89320 | 1.713000 | 53.90 |
| 28 | -78.39990 | VARIABLE | | |
| 29 | 470.93840 | 3.14990 | 1.846660 | 23.80 |
| 30 | -50.28260 | 0.80000 | 1.806100 | 40.70 |
| 31 | 49.74860 | VARIABLE | | |
| 32 | -1778.25360 | 2.56250 | 1.804200 | 46.50 |
| 33 | -114.71500 | VARIABLE | | |
| 34 | 100.64850 | 5.03180 | 1.846660 | 23.80 |
| 35 | -106.66260 | VARIABLE | | |
| 36 | -111.75280 | 1.50000 | 1.805180 | 25.50 |
| 37 | 38.86220 | 4.83610 | | |
| 38 | 38.81250 | 7.79020 | 1.517420 | 52.10 |
| 39 | 156.01700 | 32.43440 | | |
| IMAGE PLANE | ∞ | | | |

FIG. 37

| ZOOM RATIO | 2.71599 | | |
|---|---|---|---|
| | WIDE | MEDIUM | TELE |
| FOCAL LENGTH | 71.7938 | 118.22940 | 194.99130 |
| F-NUMBER | 2.9048 | 2.90305 | 2.89965 |
| ANGLE OF VIEW | 17.0090 | 10.21220 | 6.17860 |
| IMAGE HEIGHT | 21.6300 | 21.63000 | 21.63000 |
| d5 | 1.0784 | 25.26630 | 47.95950 |
| d13 | 62.0544 | 30.14220 | 1.00000 |
| d15 | 1.0000 | 8.72420 | 15.17330 |
| d28 | 5.5198 | 7.54630 | 2.50000 |
| d31 | 19.3999 | 21.10060 | 27.76610 |
| d33 | 3.0000 | 2.75650 | 6.00000 |
| d35 | 10.3463 | 6.86250 | 2.00000 |

FIG. 38

| GROUP | START SURFACE | FOCAL LENGTH |
|---|---|---|
| 1 | 1 | 157.07678 |
| 2 | 6 | -71.61874 |
| 3 | 14 | 77.08155 |
| 4 | 16 | 160.81442 |
| 5 | 29 | -73.89214 |
| 6 | 32 | 152.37686 |
| 7 | 34 | 61.8509 |
| 8 | 36 | -59.40669 |

FIG. 39

| | WIDE | MEDIUM | TELE |
|---|---|---|---|
| OBJECT DISTANCE | 800.0000 | 800.0000 | 800.0000 |
| FOCAL LENGTH | 68.7470 | 105.2069 | 145.9848 |
| d5 | 1.0784 | 25.2663 | 47.9595 |
| d13 | 62.0544 | 30.1422 | 1.0000 |
| d15 | 1.0000 | 8.7242 | 15.1733 |
| d28 | 8.0529 | 14.1701 | 19.0413 |
| d31 | 16.8669 | 14.4768 | 11.2248 |
| d33 | 2.1829 | 0.9077 | 2.3130 |
| d35 | 11.1633 | 8.7114 | 5.6869 |

FIG. 40

| SURFACE NUMBER | r | d | nd | vd |
|---|---|---|---|---|
| OBJECT PLANE | ∞ | | | |
| 1 | 114.84260 | 2.40000 | 1.90366 | 31.3 |
| 2 | 71.00500 | 8.94010 | 1.49700 | 81.6 |
| 3 | 496.79980 | 0.20000 | | |
| 4 | 73.51540 | 6.10740 | 1.59282 | 68.6 |
| 5 | 415.79190 | VARIABLE | | |
| 6 | 152.98880 | 2.00000 | 1.80420 | 46.5 |
| 7 | 21.04540 | 9.52770 | | |
| 8* | -57.67750 | 1.80000 | 1.77200 | 50.0 |
| 9* | 65.78610 | 0.20000 | | |
| 10 | 50.42170 | 5.72530 | 1.84666 | 23.8 |
| 11 | -67.41920 | 1.23260 | | |
| 12 | -40.99750 | 1.50000 | 1.80420 | 46.5 |
| 13 | -102.46900 | VARIABLE | | |
| 14 | 26.13320 | 2.93750 | 1.70154 | 41.1 |
| 15 | 74.73680 | 2.21140 | | |
| 16 (DIAPHRAGM) | ∞ | 1.50350 | | |
| 17 | 41.72730 | 1.67660 | 1.69350 | 53.2 |
| 18* | 116.24750 | 0.94210 | | |
| 19 | 40.10190 | 1.96610 | 1.43700 | 95.1 |
| 20 | 137.37950 | 0.90000 | 1.95375 | 32.3 |
| 21 | 25.47980 | 1.34360 | | |
| 22 | 26.86700 | 0.90000 | 1.80610 | 33.3 |
| 23 | 18.99230 | 5.55500 | 1.49710 | 81.6 |
| 24* | -57.70970 | 1.00000 | | |
| 25 | 226.16630 | 0.90000 | 1.67270 | 32.2 |
| 26 | 30.91200 | 5.28050 | | |
| 27 | 41.53290 | 4.72610 | 1.56883 | 56.0 |
| 28 | -30.30710 | VARIABLE | | |
| 29 | 79.30570 | 1.42770 | 1.84666 | 23.8 |
| 30 | -543.85120 | 0.80000 | 1.62041 | 60.3 |
| 31 | 20.70410 | VARIABLE | | |
| 32* | 58.90380 | 2.98090 | 1.52500 | 70.3 |
| 33 | -76.87520 | VARIABLE | | |
| 34 | -76.39650 | 1.20000 | 1.77200 | 50.0 |
| 35* | 74.00130 | VARIABLE | | |
| IMAGE PLANE | ∞ | | | |

FIG. 41

| 8TH SURFACE | K= 0.00000E+00 | A4=-6.37742E-07 | A6= 0.00000E+00 |
|---|---|---|---|
| 9TH SURFACE | K= 0.00000E+00 | A4=-2.84099E-06 | A6= 7.71332E-10 |
| 18TH SURFACE | K= 0.00000E+00 | A4= 1.58588E-05 | A6= 0.00000E+00 |
| 24TH SURFACE | K= 0.00000E+00 | A4= 6.72611E-06 | A6= 0.00000E+00 |
| 32TH SURFACE | K= 0.00000E+00 | A4=-1.16999E-05 | A6= 0.00000E+00 |
| 35TH SURFACE | K= 0.00000E+00 | A4=-1.50000E-05 | A6= 0.00000E+00 |

FIG. 42

| ZOOM RATIO | 9.39938 | | |
|---|---|---|---|
| | WIDE | MEDIUM | TELE |
| FOCAL LENGTH | 24.7429 | 75.7728 | 232.5679 |
| F-NUMBER | 3.6065 | 5.1476 | 6.4799 |
| ANGLE OF VIEW | 41.9623 | 15.7395 | 5.2593 |
| IMAGE HEIGHT | 20.0000 | 21.6300 | 21.6300 |
| d5 | 1.0000 | 25.5409 | 65.3966 |
| d13 | 39.9392 | 11.1637 | 1.0000 |
| d28 | 2.5000 | 6.6465 | 2.7390 |
| d31 | 7.4731 | 10.8194 | 14.6240 |
| d33 | 7.1636 | 3.7533 | 2.0000 |
| d35 | 20.7449 | 45.4178 | 73.4381 |

FIG. 43

| GROUP | START SURFACE | FOCAL LENGTH |
|---|---|---|
| 1 | 1 | 128.96217 |
| 2 | 6 | -23.84464 |
| 3 | 14 | 31.77283 |
| 4 | 29 | -54.15475 |
| 5 | 32 | 64.00714 |
| 6 | 34 | -48.52312 |

FIG. 44

|  | WIDE | MEDIUM | TELE |
|---|---|---|---|
| OBJECT DISTANCE | 550.0000 | 550.0000 | 550.0000 |
| d5 | 1.0000 | 25.5409 | 65.3966 |
| d13 | 39.9392 | 11.1637 | 1.0000 |
| d28 | 2.8336 | 8.6605 | 11.8718 |
| d31 | 6.8167 | 8.5191 | 5.3920 |
| d33 | 7.4863 | 4.0396 | 2.0991 |
| d35 | 20.7449 | 45.4178 | 73.4381 |

FIG. 45

| SURFACE NUMBER | r | d | nd | vd |
|---|---|---|---|---|
| OBJECT PLANE | ∞ | | | |
| 1 | 63.7131 | 1.50000 | 1.83400 | 37.3 |
| 2 | 22.4269 | 9.55270 | | |
| 3 | -102.0994 | 1.20000 | 1.71300 | 53.9 |
| 4 | 65.3257 | 3.29240 | | |
| 5 | 43.3707 | 4.30000 | 1.84666 | 23.8 |
| 6 | 172.9903 | VARIABLE | | |
| 7* | 22.8825 | 5.92740 | 1.77200 | 50.0 |
| 8* | -93.8720 | 0.50000 | | |
| 9 | -104.9511 | 0.90000 | 1.80518 | 25.5 |
| 10 | 153.8736 | 5.70320 | | |
| 11 (DIAPHRAGM) | ∞ | 1.00000 | | |
| 12 | 31.6763 | 0.80000 | 1.80610 | 33.3 |
| 13 | 11.8430 | 6.35700 | 1.49700 | 81.6 |
| 14 | -78.9236 | 0.20000 | | |
| 15 | 39.6701 | 0.93460 | 1.84666 | 23.8 |
| 16 | 76.0857 | VARIABLE | | |
| 17 | 55.2150 | 0.60000 | 1.54072 | 47.2 |
| 18 | 15.9034 | VARIABLE | | |
| 19* | 56.5545 | 1.50000 | 1.82115 | 24.1 |
| 20 | 106.3540 | | | |
| 21 | -60.3157 | 0.80000 | 1.70154 | 41.1 |
| 22 | 346.9995 | VARIABLE | | |
| 23 | -84.4904 | 4.5108 | 1.48749 | 70.4 |
| 24 | -34.1000 | 20.2682 | | |
| IMAGE PLANE | ∞ | | | |

FIG. 46

| 7TH SURFACE | K= 0.00000E+00 | A4=-4.78437E-06 | A6= 0.00000E+00 |
|---|---|---|---|
| 8TH SURFACE | K= 0.00000E+00 | A4= 5.37820E-06 | A6= 0.00000E+00 |
| 19TH SURFACE | K= 0.00000E+00 | A4=-8.02483E-07 | A6= 7.68586E-08 |

FIG. 47

| ZOOM RATIO | 2.94297 | | |
|---|---|---|---|
| | WIDE | MEDIUM | TELE |
| FOCAL LENGTH | 24.7198 | 44.9999 | 72.7498 |
| F-NUMBER | 3.6053 | 4.9956 | 5.7685 |
| ANGLE OF VIEW | 44.4804 | 25.5043 | 16.5655 |
| IMAGE HEIGHT | 21.6300 | 21.6300 | 21.6300 |
| d6 | 36.9765 | 11.9226 | 1.0000 |
| d16 | 2.2167 | 4.6245 | 6.5836 |
| d18 | 5.5129 | 6.2149 | 5.1436 |
| d20 | 2.2618 | 2.4880 | 2.2446 |
| d22 | 1.6856 | 13.4482 | 33.6818 |

FIG. 48

| GROUP | START SURFACE | FOCAL LENGTH |
|---|---|---|
| 1 | 1 | -39.05840 |
| 2 | 7 | 25.97546 |
| 3 | 17 | -41.53234 |
| 4 | 19 | 145.11658 |
| 5 | 21 | -73.18515 |
| 6 | 23 | 113.94388 |

FIG. 49

|  | WIDE | MEDIUM | TELE |
|---|---|---|---|
| OBJECT DISTANCE | 300.0000 | 300.0000 | 300.0000 |
| d6 | 36.9765 | 11.9226 | 1.0000 |
| d16 | 2.8832 | 6.4117 | 9.7273 |
| d18 | 4.0675 | 3.8086 | 2.0000 |
| d20 | 3.0407 | 3.1072 | 2.2446 |
| d22 | 1.6856 | 13.4482 | 33.6818 |

FIG. 50

| SURFACE NUMBER | r | d | nd | vd |
|---|---|---|---|---|
| OBJECT PLANE | ∞ |  |  |  |
| 1 | 67.46590 | 1.5000 | 1.83400 | 37.3 |
| 2 | 22.72740 | 9.6161 |  |  |
| 3 | -97.75550 | 1.2000 | 1.69680 | 55.5 |
| 4 | 67.09320 | 2.8981 |  |  |
| 5 | 43.39390 | 4.3681 | 1.84666 | 23.8 |
| 6 | 176.13480 | VARIABLE |  |  |
| 7* | 23.12150 | 6.67260 | 1.77200 | 50.0 |
| 8* | -80.46600 | 0.50000 |  |  |
| 9 | -87.40760 | 0.90000 | 1.80518 | 25.5 |
| 10 | 149.99030 | 5.56250 |  |  |
| 11 (DIAPHRAGM) | ∞ | 1.00000 |  |  |
| 12 | 27.74710 | 0.80000 | 1.80610 | 33.3 |
| 13 | 11.64230 | 5.63930 | 1.49700 | 81.6 |
| 14 | -96.39190 | 0.20000 |  |  |
| 15 | 39.07800 | 0.99430 | 1.84666 | 23.8 |
| 16 | 73.58310 | VARIABLE |  |  |
| 17 | 82.84870 | 0.60000 | 1.54814 | 45.8 |
| 18 | 15.87980 | VARIABLE |  |  |
| 19* | 89.43000 | 1.50000 | 1.64000 | 19.0 |
| 20 | -142.89130 | VARIABLE |  |  |
| 21 | -46.22180 | 0.80000 | 1.75520 | 27.5 |
| 22 | 886.81000 | VARIABLE |  |  |
| 23 | -80.39220 | 4.13680 | 1.59349 | 67.0 |
| 24 | -35.50930 | VARIABLE |  |  |
| IMAGE PLANE | ∞ |  |  |  |

FIG. 51

| 7TH SURFACE | K= 0.00000E+00 | A4=-4.70300E-06 | A6= 0.00000E+00 |
|---|---|---|---|
| 8TH SURFACE | K= 0.00000E+00 | A4= 5.36511E-06 | A6= 0.00000E+00 |
| 19TH SURFACE | K= 0.00000E+00 | A4=-5.42857E-07 | A6= 1.15640E-07 |

FIG. 52

| | WIDE | MEDIUM | TELE |
|---|---|---|---|
| FOCAL LENGTH | 24.72000 | 44.99970 | 72.7493 |
| F-NUMBER | 3.60503 | 4.99576 | 5.7683 |
| ANGLE OF VIEW | 44.47590 | 25.51220 | 16.5454 |
| IMAGE HEIGHT | 21.63000 | 21.63000 | 21.6300 |
| d6 | 37.21570 | 12.24740 | 1.0000 |
| d16 | 2.22120 | 4.47210 | 6.5258 |
| d18 | 5.32620 | 6.01780 | 4.8002 |
| d20 | 2.04590 | 2.60420 | 2.1000 |
| d22 | 1.62080 | 13.78240 | 33.2078 |
| d24 | 21.18210 | 20.68180 | 21.9756 |

FIG. 53

| GROUP | START SURFACE | FOCAL LENGTH |
|---|---|---|
| 1 | 1 | -39.11980 |
| 2 | 7 | 25.30783 |
| 3 | 17 | -35.95389 |
| 4 | 19 | 86.16198 |
| 5 | 21 | -58.15122 |
| 6 | 23 | 103.60989 |

FIG. 54

| | WIDE | MEDIUM | TELE |
|---|---|---|---|
| OBJECT DISTANCE | 300.0000 | 300.0000 | 300.0000 |
| d6 | 37.2157 | 12.2474 | 1.0000 |
| d16 | 2.7701 | 5.9969 | 9.2987 |
| d18 | 4.1984 | 4.0492 | 2.0273 |
| d20 | 2.6249 | 3.0479 | 2.1000 |
| d22 | 1.6208 | 13.7824 | 33.2078 |
| d24 | 21.1821 | 20.6818 | 21.9756 |

FIG. 55

| SURFACE NUMBER | r | d | nd | vd |
| --- | --- | --- | --- | --- |
| OBJECT PLANE | ∞ | | | |
| 1 | 151.47430 | 2.40000 | 1.90366 | 31.3 |
| 2 | 94.77890 | 8.97120 | 1.49700 | 81.6 |
| 3 | -1538.85890 | 0.20000 | | |
| 4 | 95.54070 | 6.99620 | 1.43700 | 95.1 |
| 5 | 1408.22310 | VARIABLE | | |
| 6 | 188.36590 | 4.94190 | 2.00100 | 29.1 |
| 7 | -124.52190 | 1.80000 | 1.63854 | 55.4 |
| 8 | 32.65720 | 6.62800 | | |
| 9 | 34.39310 | 4.26250 | 1.67270 | 32.2 |
| 10 | 88.69360 | 1.50000 | 1.80420 | 46.5 |
| 11 | 47.88720 | 5.85180 | | |
| 12 | -53.88190 | 1.50000 | 1.90366 | 31.3 |
| 13 | -170.40170 | VARIABLE | | |
| 14 | 58.97580 | 3.42830 | 1.80420 | 46.5 |
| 15 | 1228.74110 | 0.10000 | | |
| 16 | 34.41080 | 7.80050 | 1.49700 | 81.6 |
| 17 | -112.43160 | 6.00000 | 1.80420 | 46.5 |
| 18 | 25.75760 | 4.77550 | | |
| 19 (DIAPHRAGM) | ∞ | 2.55860 | | |
| 20 | 86.08400 | 1.20000 | 1.84666 | 23.8 |
| 21 | 40.47930 | 5.00620 | 1.51680 | 64.2 |
| 22 | -104.27990 | 0.20000 | | |
| 23 | 75.91980 | 3.04010 | 1.77250 | 49.6 |
| 24 | -228.76060 | 3.09380 | | |
| 25 | -38.78290 | 1.20000 | 1.51823 | 59.0 |
| 26 | 31.40730 | 8.17840 | 1.59282 | 68.6 |
| 27 | -35.54840 | VARIABLE | | |
| 28 | 116.99200 | 2.83470 | 1.92119 | 24.0 |
| 29 | -57.27040 | 0.70000 | 1.72342 | 38.0 |
| 30 | 29.75650 | VARIABLE | | |
| 31 | 47.66610 | 3.98820 | 1.49700 | 81.6 |
| 32 | -137.76780 | VARIABLE | | |
| 33 | -114.86890 | 1.30000 | 1.65844 | 50.9 |
| 34 | 127.37720 | BF | | |
| IMAGE PLANE | ∞ | | | |

FIG. 56

| ZOOM RATIO | 3.13642 | | |
|---|---|---|---|
| | WIDE | MEDIUM | TELE |
| FOCAL LENGTH | 61.82330 | 105.7396 | 193.9039 |
| F-NUMBER | 2.91649 | 2.9165 | 2.9152 |
| ANGLE OF VIEW | 9.91180 | 5.7838 | 3.1597 |
| IMAGE HEIGHT | 10.81500 | 10.8150 | 10.8150 |
| d5 | 0.60000 | 32.4503 | 62.7047 |
| d13 | 62.70470 | 30.8544 | 0.6000 |
| d27 | 7.92880 | 7.6226 | 2.0000 |
| d30 | 17.31410 | 15.7117 | 27.7502 |
| d32 | 12.03120 | 13.9398 | 7.5240 |

FIG. 57

| GROUP | START SURFACE | FOCAL LENGTH |
|---|---|---|
| 1 | 1 | 160.75342 |
| 2 | 6 | -55.86637 |
| 3 | 14 | 53.11418 |
| 4 | 28 | -79.17536 |
| 5 | 31 | 71.76726 |
| 6 | 33 | -91.53762 |

FIG. 58

| ZOOM RATIO | 3.13642 | | |
|---|---|---|---|
| | WIDE | MEDIUM | TELE |
| OBJECT DISTANCE | 1000.0000 | 1000.0000 | 1000.0000 |
| d5 | 0.6000 | 32.4503 | 62.7047 |
| d13 | 62.7047 | 30.8544 | 0.6000 |
| d27 | 9.1620 | 11.2958 | 12.1220 |
| d30 | 14.7987 | 8.8362 | 6.7701 |
| d32 | 13.3133 | 17.1420 | 18.3820 |

ZOOM LENS SYSTEM, INTERCHANGEABLE LENS DEVICE, AND CAMERA SYSTEM

BACKGROUND

1. Technical Field

The present disclosure relates to a zoom lens system, an interchangeable lens device, and a camera system.

2. Description of the Related Art

Unexamined Japanese Patent Publication No. 2013-105131 discloses a zoom lens system having a positive group, a negative group, a positive group, and a rear group, where focusing is performed by two focusing groups which are in the rear group and each of which has a negative power and a positive power.

Unexamined Japanese Patent Publication No. 2014-157225 discloses a zoom lens system having a positive group, a negative group, and a rear group, where focusing is performed by two focusing groups which are in the rear group and each of which has a negative power and a positive power.

Unexamined Japanese Patent Publication No. 2014-186306 discloses a zoom lens system having a positive group, a negative group, and a rear group, where the rear group has a focusing group.

SUMMARY

A zoom lens system of the present disclosure includes a plurality of lens groups each of which is made up of at least one lens element, the zoom lens system including, in order from an object side to an image side: a first focusing lens group having a negative power; and a second focusing lens group having a positive power, wherein when zooming is performed from a wide end to a telephoto end, the first focusing lens group and the second focusing lens group move along an optical axis, when focusing is performed from an infinity focusing state to a proximity object focusing state, the first focusing lens group and the second focusing lens group move to perform the focusing, and the following conditional expressions (1) and (2) are satisfied:

$$-20 < \beta 1t/\beta 1w \times \beta 2t/\beta 2w < 20 \quad (1)$$

$$0.25 < |f1/f2| < 1.30 \quad (2)$$

where:

$\beta 1t$ is a lateral magnification of the first focusing lens group at the telephoto end;

$\beta 1w$ is a lateral magnification of the first focusing lens group at the wide end;

$\beta 2t$ is a lateral magnification of the second focusing lens group at the telephoto end;

$\beta 2w$ is a lateral magnification of the second focusing lens group at the wide end;

$f1$ is a focal length of the first focusing lens group; and $f2$ is a focal length of the second focusing lens group.

An interchangeable lens device of the present disclosure includes: (i) a zoom lens system including a plurality of lens groups each of which is made up of at least one lens element, the zoom lens system including, in order from an object side to an image side: (a) a first focusing lens group having a negative power; and (b) a second focusing lens group having a positive power, wherein when zooming is performed from a wide end to a telephoto end, the first focusing lens group and the second focusing lens group move along an optical axis, and when focusing is performed from an infinity focusing state to a proximity object focusing state, the first focusing lens group and the second focusing lens group move to perform the focusing; and (ii) a lens mount which is attachable to a camera body including an imaging element which receives an optical image formed by the zoom lens system and converts the optical image into an electric image signal, wherein the following conditional expressions (1) and (2) are satisfied:

$$-20 < \beta 1t/\beta 1w \times \beta 2t/\beta 2w < 20 \quad (1)$$

$$0.25 < |f1/f2| < 1.30 \quad (2)$$

A camera system of the present disclosure includes: (i) an interchangeable lens device including: a zoom lens system which includes a plurality of lens groups each of which is made up of at least one lens element, the zoom lens system including, in order from an object side to an image side: (a) a first focusing lens group having a negative power; and (b) a second focusing lens group having a positive power, wherein when zooming is performed from a wide end to a telephoto end, the first focusing lens group and the second focusing lens group move along an optical axis, and when focusing is performed from an infinity focusing state to a proximity object focusing state, the first focusing lens group and the second focusing lens group move to perform the focusing; and (ii) a camera body which is detachably coupled to the interchangeable lens device via a camera mount and which includes an imaging element which receives an optical image formed by the zoom lens system and converts the optical image into an electric image signal, wherein the following conditional expressions (1) and (2) are satisfied:

$$-20 < \beta 1t/\beta 1w \times \beta 2t/\beta 2w < 20 \quad (1)$$

$$0.25 < |f1/f2| < 1.30 \quad (2)$$

BRIEF DESCRIPTION OF DRAWINGS

FIGS. 3A, 3B, and 3C are longitudinal aberration diagrams of the zoom lens system according to the first numerical example in a proximity object focusing state;

FIGS. 6A, 6B, and 6C are longitudinal aberration diagrams of the zoom lens system according to the second numerical example in an infinity focusing state;

FIGS. 7A, 7B, and 7C are longitudinal aberration diagrams of the zoom lens system according to the second numerical example in a proximity object focusing state;

FIGS. 10A, 10B, and 10C are longitudinal aberration diagrams of the zoom lens system according to the third numerical example in an infinity focusing state;

FIGS. 11A, 11B, and 11C are longitudinal aberration diagrams of the zoom lens system according to the third numerical example in a proximity object focusing state;

FIGS. 14A, 14B, and 14C are longitudinal aberration diagrams of the zoom lens system according to the fourth numerical example in an infinity focusing state;

FIGS. 15A, 15B, and 15C are longitudinal aberration diagrams of the zoom lens system according to the fourth numerical example in a proximity object focusing state;

FIGS. 18A, 18B, and 18C are longitudinal aberration diagrams of the zoom lens system according to the fifth numerical example in an infinity focusing state;

FIGS. 21A, 21B, 21C are longitudinal aberration diagrams of the zoom lens system according to the sixth numerical example in an infinity focusing state;

FIGS. 24A, 24B, and 24C are longitudinal aberration diagrams of the zoom lens system according to the seventh exemplary embodiment in an infinity focusing state;

FIGS. 25A, 25B, and 25C are longitudinal aberration diagrams of the zoom lens system according to the seventh exemplary embodiment in a proximity object focusing state;

FIG. 28 is a diagram showing surface data of the zoom lens system of the first numerical example;

FIG. 29 is a diagram showing various data of the zoom lens system of the first numerical example at the infinity focusing state;

FIG. 30 is a diagram showing data of a zooming lens group of the zoom lens system of the first numerical example;

FIG. 31 is a diagram showing various data of the zoom lens system of the first numerical example in the proximity object focusing state;

FIG. 32 is a diagram showing surface data of the zoom lens system of the second numerical example;

FIG. 33 is a diagram showing various data of the zoom lens system of the second numerical example at the infinity focusing state;

FIG. 34 is a diagram showing data of a zooming lens group of the zoom lens system of the second numerical example;

FIG. 35 is a diagram showing various data of the zoom lens system of the second numerical example in the proximity object focusing state;

FIG. 36 is a diagram showing surface data of the zoom lens system of the third numerical example;

FIG. 37 is a diagram showing various data of the zoom lens system of the third numerical example at the infinity focusing state;

FIG. 38 is a diagram showing data of a zooming lens group of the zoom lens system of the third numerical example;

FIG. 39 is a diagram showing various data of the zoom lens system of the third numerical example in the proximity object focusing state;

FIG. 40 is a diagram showing surface data of the zoom lens system of the fourth numerical example;

FIG. 41 is a diagram showing aspherical data of the zoom lens system of the fourth numerical example;

FIG. 42 is a diagram showing various data of the zoom lens system of the fourth numerical example at the infinity focusing state;

FIG. 43 is a diagram showing data of a zooming lens group of the zoom lens system of the fourth numerical example;

FIG. 44 is a diagram showing various data of the zoom lens system of the fourth numerical example in the proximity object focusing state;

FIG. 45 is a diagram showing surface data of the zoom lens system of the fifth numerical example;

FIG. 46 is a diagram showing aspherical data of the zoom lens system of the fifth numerical example;

FIG. 47 is a diagram showing various data of the zoom lens system of the fifth numerical example at the infinity focusing state;

FIG. 48 is a diagram showing data of a zooming lens group of the zoom lens system of the fifth numerical example;

FIG. 49 is a diagram showing various data of the zoom lens system of the fifth numerical example in the proximity object focusing state;

FIG. 50 is a diagram showing surface data of the zoom lens system of the sixth numerical example;

FIG. 51 is a diagram showing aspherical data of the zoom lens system of the sixth numerical example;

FIG. 52 is a diagram showing various data of the zoom lens system of the sixth numerical example at the infinity focusing state;

FIG. 53 is a diagram showing data of a zooming lens group of the zoom lens system of the sixth numerical example;

FIG. 54 is a diagram showing various data of the zoom lens system of the sixth numerical example in the proximity object focusing state;

FIG. 55 is a diagram showing surface data of the zoom lens system of the seventh numerical example;

FIG. 56 is a diagram showing various data of the zoom lens system of the seventh numerical example at the infinity focusing state;

FIG. 57 is a diagram showing data of a zooming lens group of the zoom lens system of the seventh numerical example; and FIG. 58 is a diagram showing various data of the zoom lens system of the seventh numerical example in the proximity object focusing state.

DETAILED DESCRIPTION

1. Configuration

FIG. 1A to FIG. 1C, FIG. 5A to FIG. 5C, FIG. 9A to FIG. 9C, FIG. 13A to FIG. 13C, FIG. 17A to FIG. 17C, FIG. 20A to FIG. 20C, and FIG. 23A to FIG. 23C are each lens arrangement diagrams showing a zoom lens system according to each of the first to seventh exemplary embodiments at an infinity focusing state. In the lens arrangement diagrams, FIG. 1A, FIG. 5A, FIG. 9A, FIG. 13A, FIG. 17A, FIG. 20A, and FIG. 23A are the lens arrangement diagrams at a wide end. FIG. 1B, FIG. 5B, FIG. 9B, FIG. 13B, FIG. 17B, FIG. 20B, and FIG. 23B are the lens arrangement diagrams at an intermediate position. FIG. 1C, FIG. 5C, FIG. 9C, FIG. 13C, FIG. 17C, FIG. 20C, and FIG. 23C are the lens arrangement diagrams at a telephoto end.

In the embodiments, the "wide end" represents a shortest focal length state. The focal length in the shortest focal length state is fW. The "intermediate position" represents an intermediate focal length state. A focal length fm in the intermediate focal length state is defined by the following equation (Mathematical Expression 1).

$$fm = \sqrt{(f_W * f_T)}$$  Mathematical Expression 1:

The "telephoto end" represents a longest focal length state. The focal length in the longest focal length state is fT.

In the lens arrangement diagrams shown in FIG. 1A, FIG. 5A, FIG. 9A, FIG. 13A, FIG. 17A, FIG. 20A, and FIG. 23A, each arrow with a polygonal line shown in each drawing is obtained by connecting, in order from top to bottom, the positions of the lens group in the wide end, the intermediate position, and the telephoto end. Between the wide end and the intermediate position and between the intermediate position and the telephoto end, the straight lines simply connect the positions, and do not represent the actual movement of each lens group.

The arrows added to the lens groups in each drawing represent the movement for focusing from the infinity focusing state toward the proximity object focusing state. Note that, in FIG. 1A, FIG. 5A, FIG. 9A, FIG. 13A, FIG. 17A, FIG. 20A, and FIG. 23A, reference symbols are added to the lens groups, and the arrows representing the focusing are added, for convenience, to the under parts of the reference symbols of the lens groups. A specific description will be made later, with respect to each exemplary embodiment, on the direction of the movement of each lens group at the time of focusing in each zooming state.

Figure 13A:
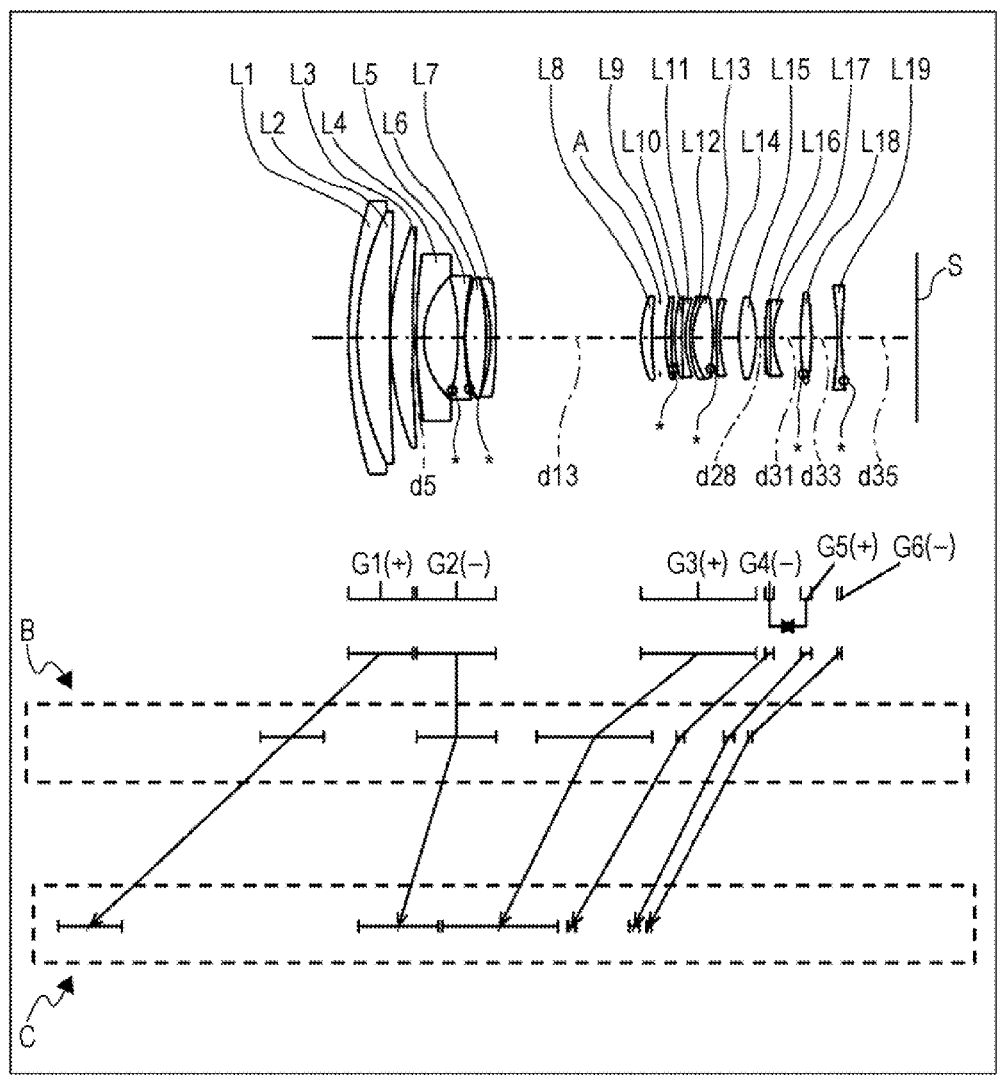
FIG. 13A is a lens arrangement diagram showing an infinity focusing state of a zoom lens system according to a fourth exemplary embodiment (fourth numerical example)
Figure 17A:
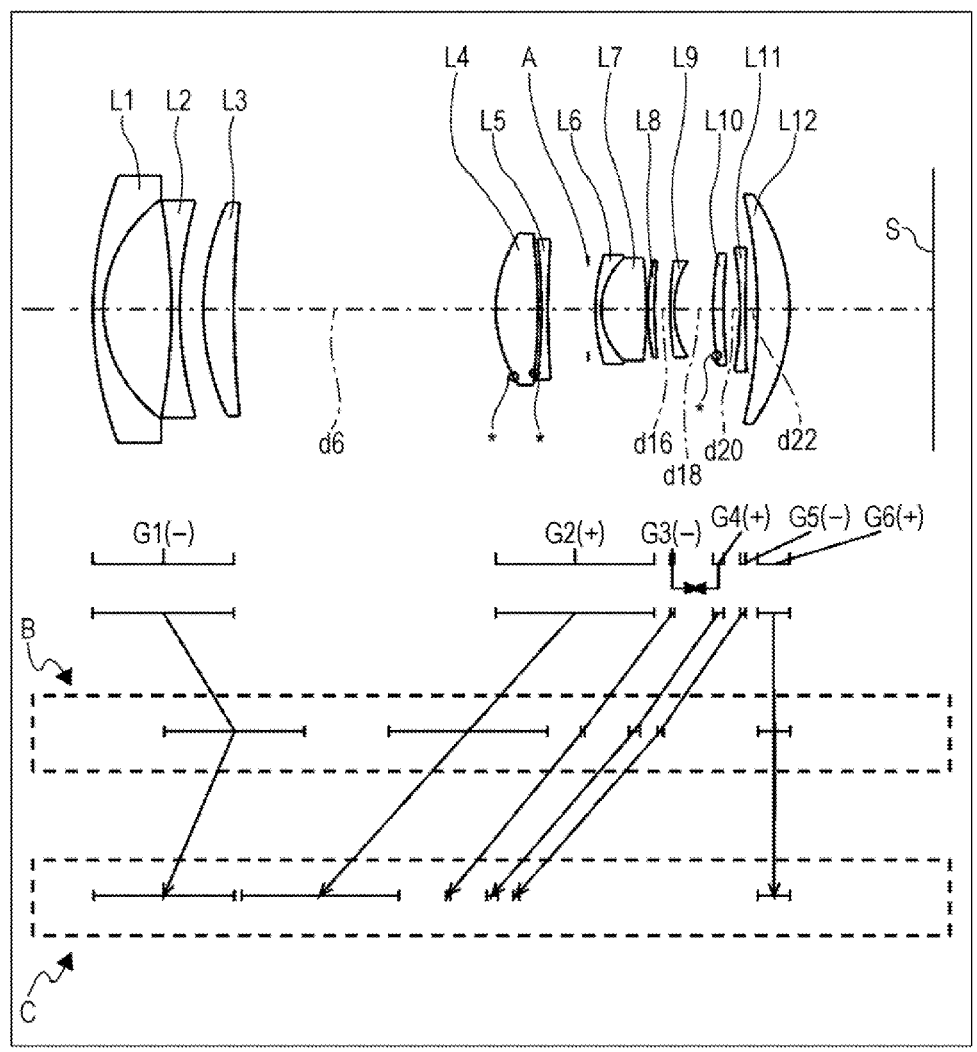
FIG. 17A is a lens arrangement diagram showing an infinity focusing state of a zoom lens system according to a fifth exemplary embodiment (fifth numerical example)
Figure 20A:
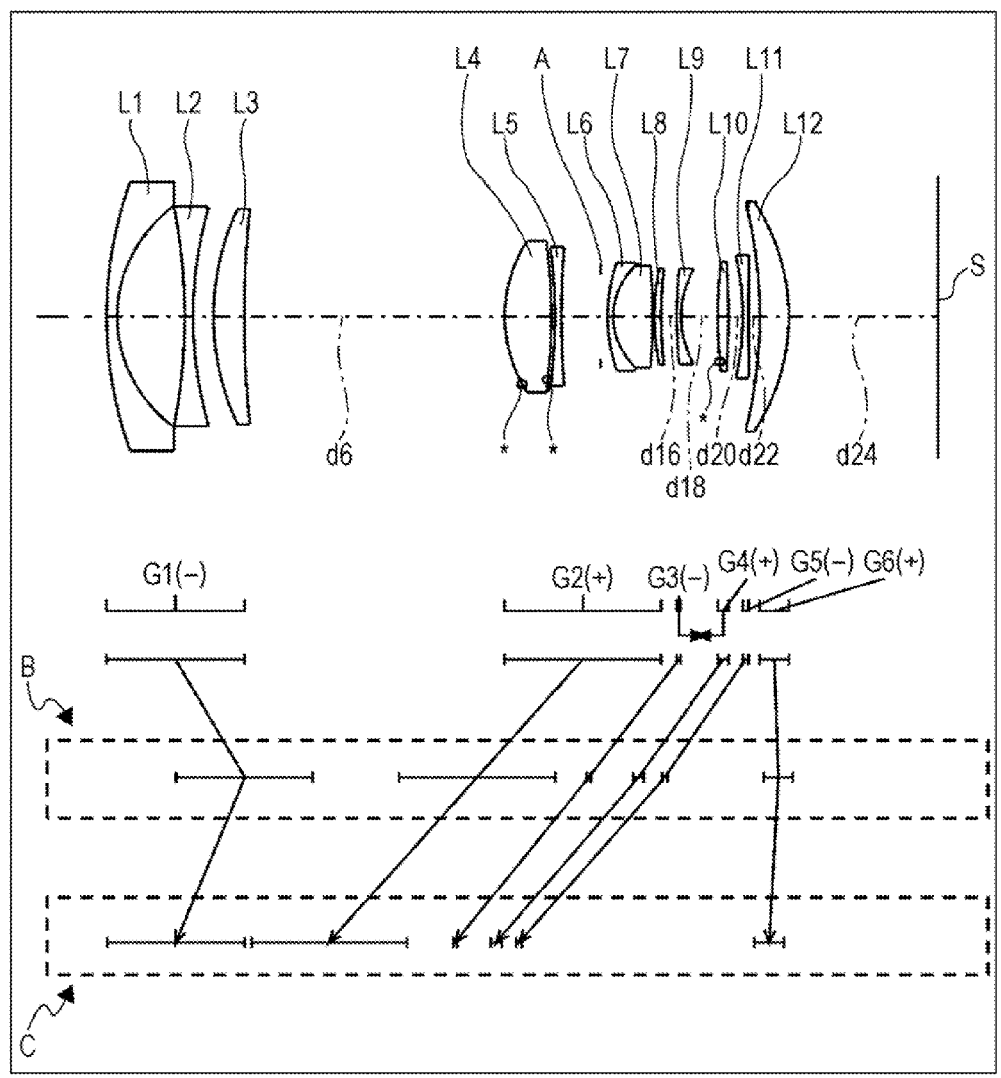
FIG. 20A is a lens arrangement diagram showing an infinity focusing state of a zoom lens system according to a sixth exemplary embodiment (sixth numerical example)

In FIG. 13A, FIG. 17A, and FIG. 20A, the circles are given the specific surfaces, and the asterisks "*" are added to the lines drawn from the circles, where the asterisks "*" indicate that the surfaces with the circles are aspherical. In the drawings, the symbols "+" or "−" added to each of the reference symbols of the lens groups respectively correspond to the plus and minus sign of the power of the lens group. Further, in the drawings, the straight line shown on the rightmost side represents the position of image plane S.

First Exemplary Embodiment

Figure 1A:
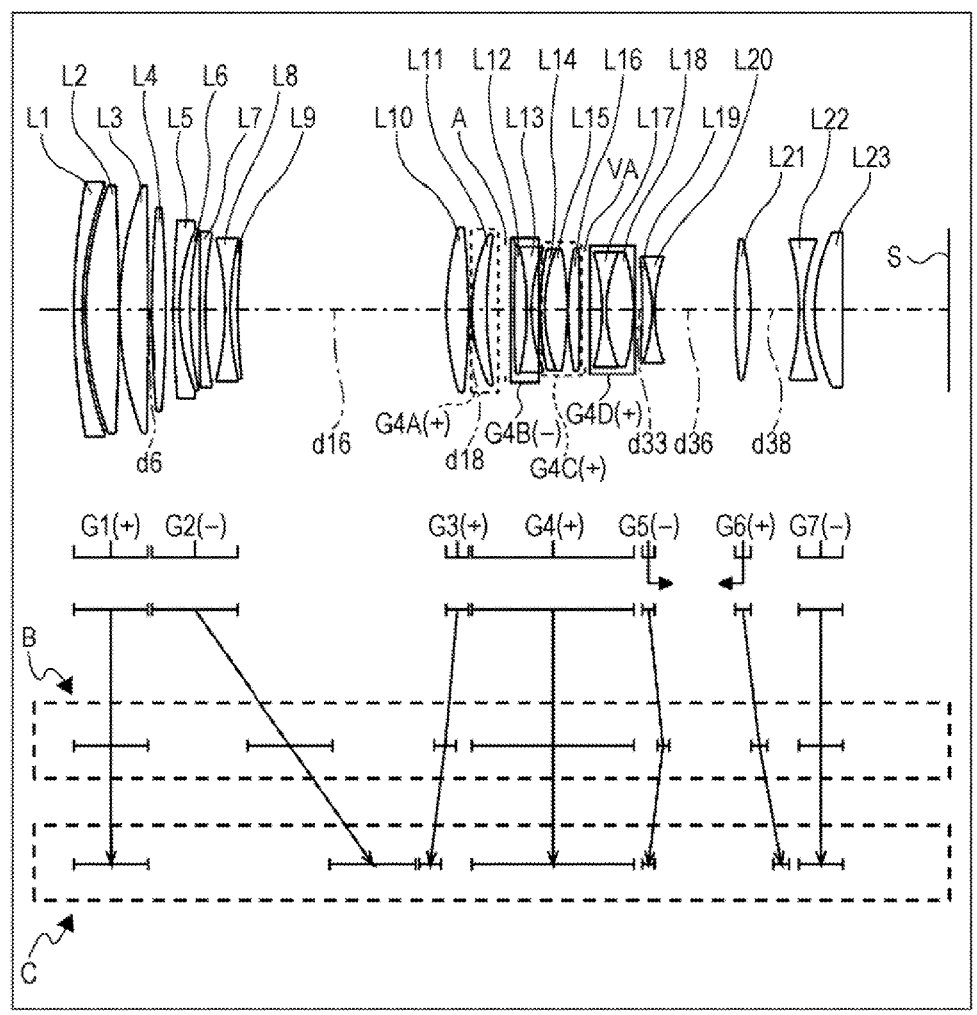
FIG. 1A is a lens arrangement diagram showing an infinity focusing state of a zoom lens system according to a first exemplary embodiment (first numerical example)
Figure 1B:
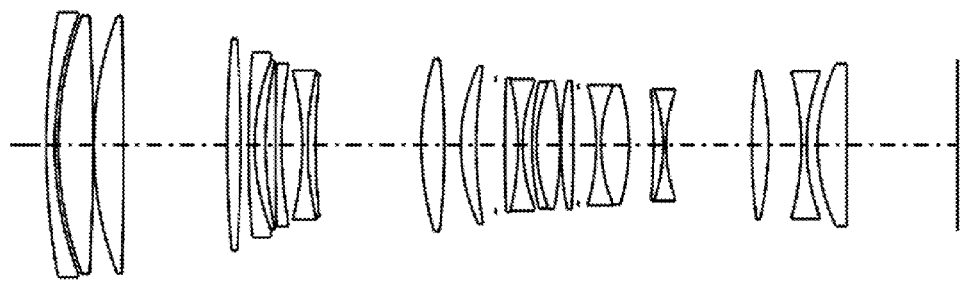
FIG. 1B is a lens arrangement diagram in the state indicated by symbol B in FIG. 1A.
Figure 1C:
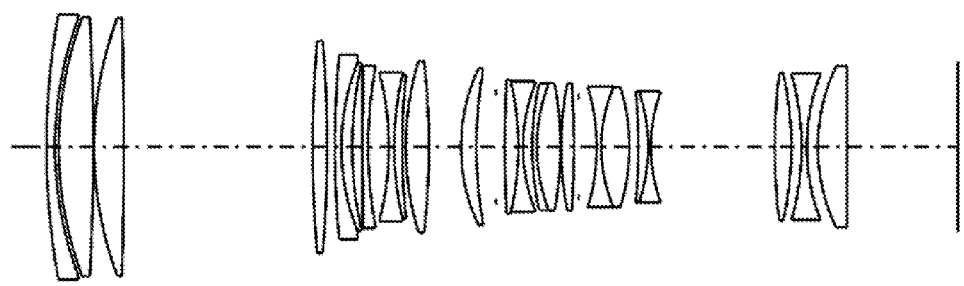
FIG. 1C is a lens arrangement diagram in the state indicated by symbol C in FIG. 1A.
Figure 2A:
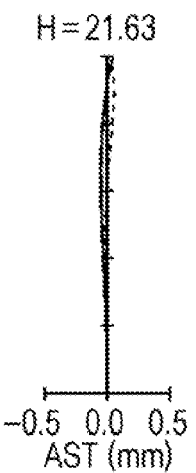
FIGS. 2A, 2B, and 2C are longitudinal aberration diagrams of the zoom lens system according to the first numerical example in an infinity focusing state.
Figure 2B:
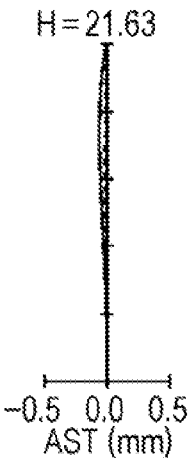
Figure 2C:
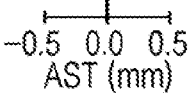
Figure 4:
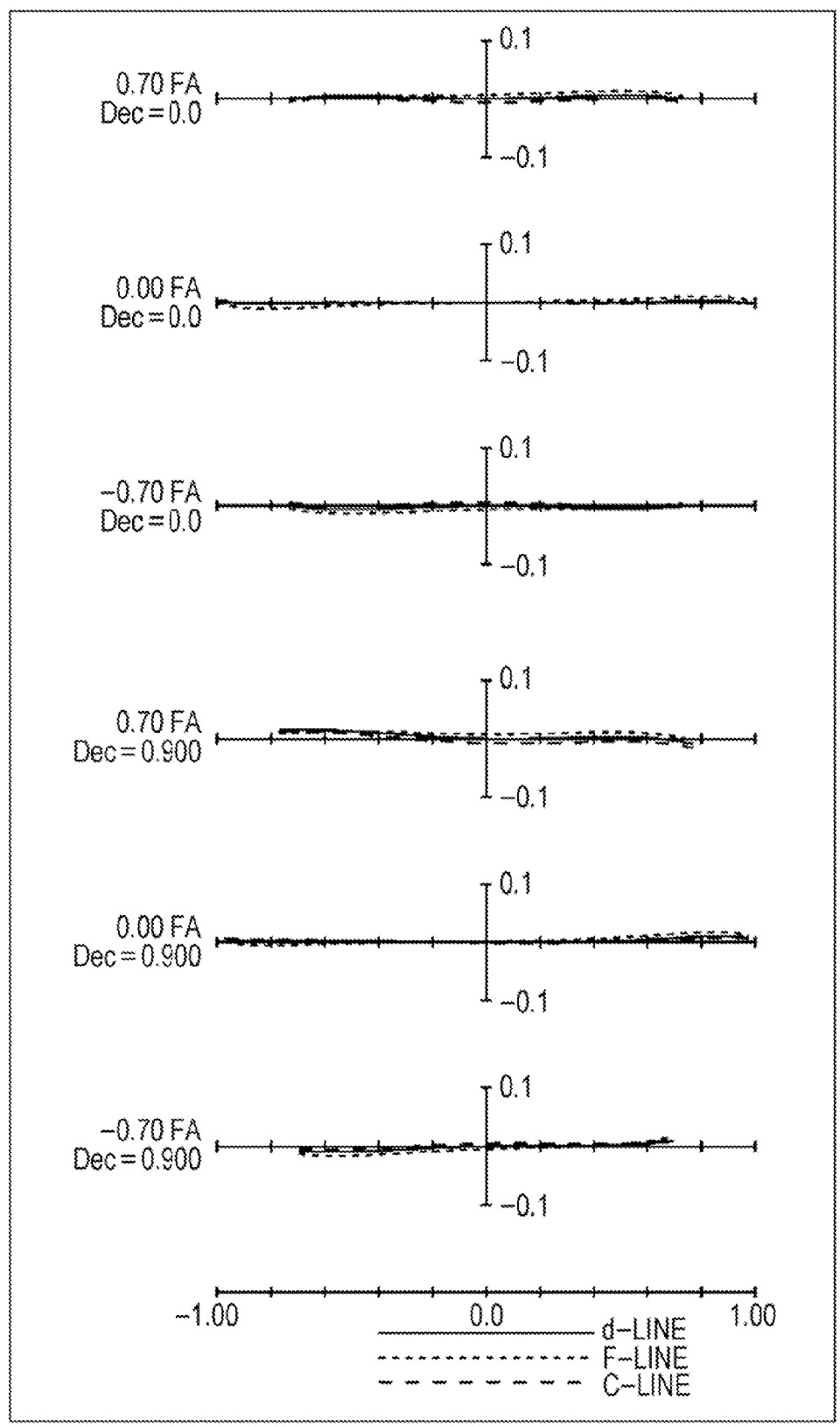
FIG. 4 shows lateral aberration diagrams of the zoom lens system according to the first numerical example at a telephoto end in a basic state in which image stabilization is not being performed and in an image stabilizing state in which the image stabilization is being performed.

As shown in FIG. 1A, FIG. 1B, and FIG. 1C, first lens group G1 in a zoom lens system according to the first exemplary embodiment is made up of, in order from an object side to an image plane side, first lens element L1 in a negative meniscus shape with a convex surface directed toward the object side, second lens element L2 in a biconvex shape, and third lens element L3 in a biconvex shape.

Second lens group G2 is made up of, in order from the object side to the image plane side, fourth lens element L4 in a biconvex shape, fifth lens element L5 in a negative meniscus shape with a convex surface directed toward the object side, sixth lens element L6 in a positive meniscus shape with a convex surface directed toward the object side, seventh lens element L7 in a negative meniscus shape with a convex surface directed toward the object side, eighth lens element L8 in a biconcave shape, and ninth lens element L9 in a positive meniscus shape with a convex surface directed toward the object side. In these lens elements, fifth lens element L5 and sixth lens element L6, and eighth lens element L8 and ninth lens element L9 are each cemented.

Third lens group G3 is made up only of 10th lens element L10 in a biconvex shape.

Fourth lens group G4 is made up of, in order from the object side to the image plane side, 11th lens element L11 in a positive meniscus shape with a convex surface directed toward the object side, 12th lens element L12 in a biconvex shape, 13th lens element L13 in a biconcave shape, 14th lens element L14 in a negative meniscus shape with a convex surface directed toward the object side, 15th lens element L15 in a biconvex shape, 16th lens element L16 in a biconvex shape, 17th lens element L17 in a biconcave shape, and 18th lens element L18 in a biconvex shape. In these lens elements, 12th lens element L12 and 13th lens element L13, 14th lens element L14 and 15th lens element L15, and 17th lens element L17 and 18th lens element L18 are each cemented. Further, aperture diaphragm A is provided on the image plane side of 11th lens element L11, and variable light aperture diaphragm VA is provided on the image plane side of 16th lens element L16.

Fifth lens group G5 is made up of, in order from the object side to the image plane side, 19th lens element L19 in a positive meniscus shape with a convex surface directed toward the image plane side, and 20th lens element L20 in a biconcave shape. In these lens elements, 19th lens element L19 and 20th lens element are cemented.

Sixth lens group G6 is made up only of 21st lens element L21 in a biconvex shape.

Seventh lens group G7 is made up of, in order from the object side to the image plane side, 22nd lens element L22 in a biconcave shape, and 23rd lens element L23 in a piano-convex shape with a convex surface directed toward the object side positive. Note that 14th lens element L14, 15th lens element L15, and 16th lens element L16, which are lens elements constituting fourth lens group G4, correspond to an image stabilizer lens group (to be described later) which moves in the direction perpendicular to an optical axis to optically correct image shake.

When zooming is performed from the wide end to the telephoto end at the time of imaging, third lens group G3 moves monotonically toward the object side, second lens group G2 and sixth lens group G6 move monotonically toward the image plane side, and fifth lens group G5 moves along a locus convex toward the image plane side. That is to say, when zooming is performed, the lens groups move along the optical axis in such a manner that the distances between first lens group G1 and second lens group G2, between third lens group G3 and fourth lens group G4, and between fifth lens group G5 and sixth lens group G6 increase, that the distances between second lens group G2 and third lens group G3 and between sixth lens group G6 and seventh lens group G7 decrease, and that the distance between fourth lens group G4 and fifth lens group G5 varies.

Fourth lens group G4 is made up of, in order from the object side to the image side, first sub-lens group G4A (11th lens element L11) having a positive power, second sub-lens group G4B (12th lens element L12 and 13th lens element L13) having a negative power, third sub-lens group G4C (14th lens element L14, 15th lens element L15, and 16th lens element L16) having a positive power, and fourth sub-lens group G4D (17th lens element L17 and 18th lens element L18) having a positive power. Third sub-lens group G4C moves in the direction perpendicular to the optical axis to optically correct image shake. Further, aperture diaphragm A is disposed between first sub-lens group G4A and second sub-lens group G4B. In addition, between third sub-lens group G4C and fourth sub-lens group G4D, there is disposed variable light aperture diaphragm VA which changes the diameter at a time of zooming from the wide end to the telephoto end. At the time of zooming from the wide end to the telephoto end, there is no change in the distance between first sub-lens group G4A and second sub-lens group G4B, in the distance between second sub-lens group G4B and third sub-lens group G4C, or in the distance between third sub-lens group G4C and fourth sub-lens group G4D. At the time of focusing from the infinity focusing state to the proximity object focusing state, fifth lens group G5 moves toward the image plane side along the optical axis in any zooming state, and sixth lens group G6 moves toward the object side along the optical axis in any zooming state.

Second Exemplary Embodiment

Figure 5A:
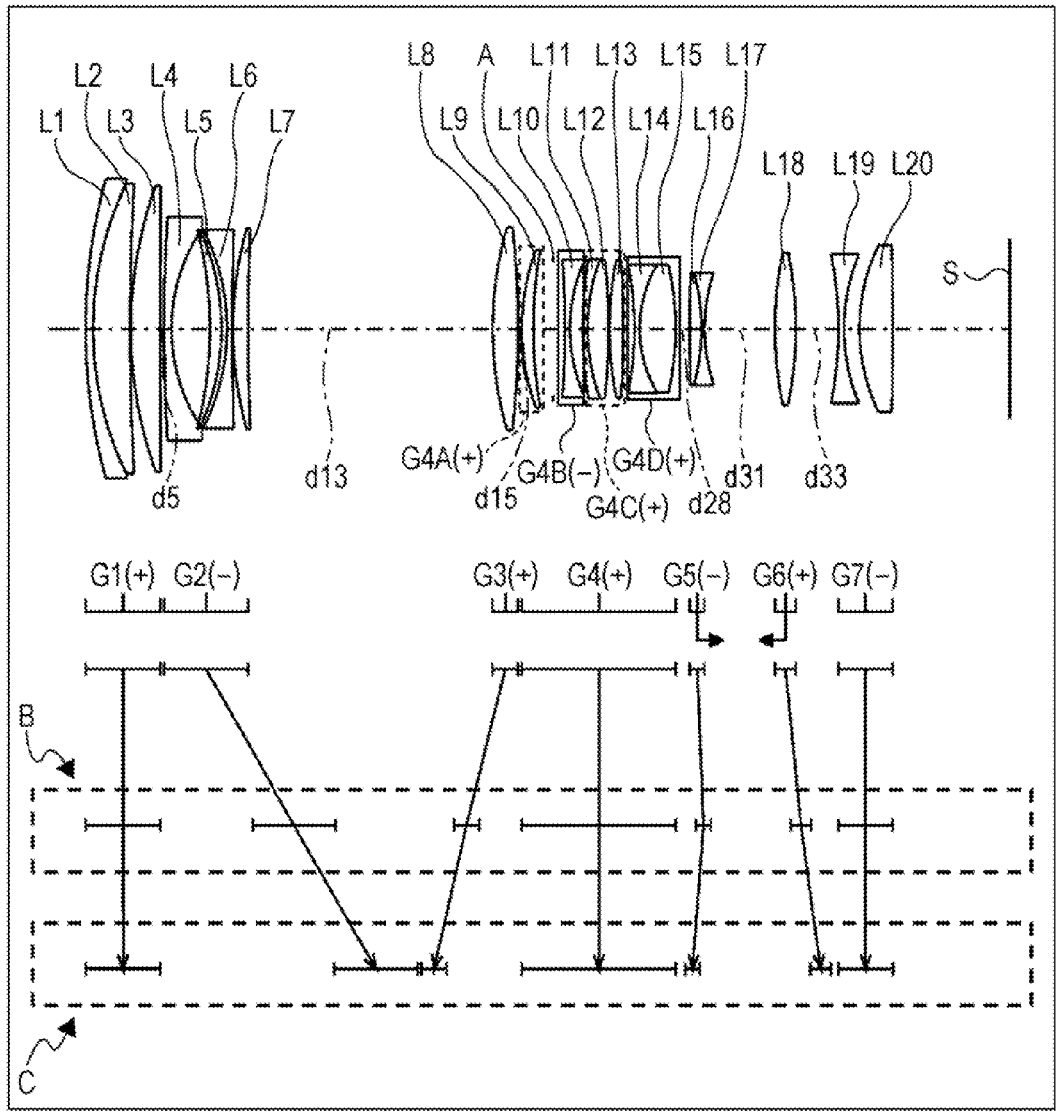
FIG. 5A is a lens arrangement diagram showing an infinity focusing state of a zoom lens system according to a second exemplary embodiment (second numerical example)
Figure 5B:
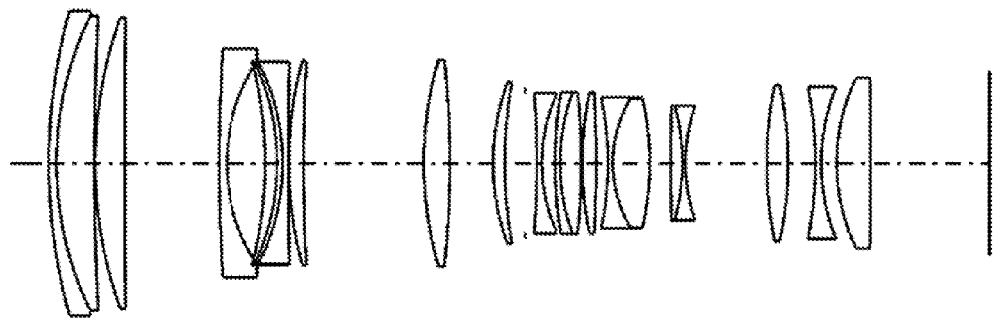
FIG. 5B is a lens arrangement diagram in the state indicated by symbol B in FIG. 5A.
Figure 5C:
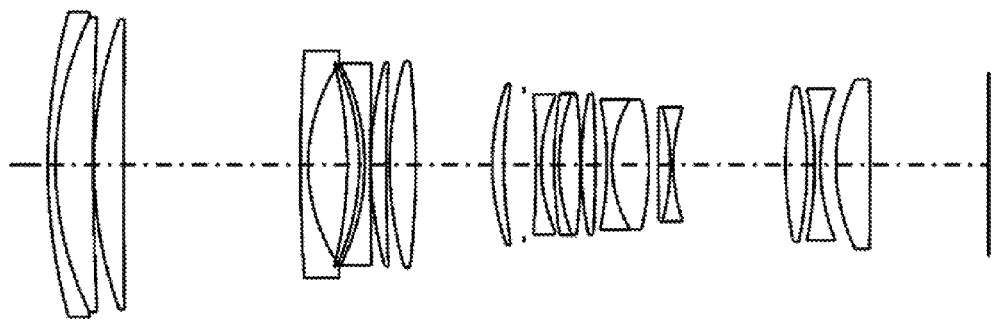
FIG. 5C is a lens arrangement diagram in the state indicated by symbol C in FIG. 5A.
Figure 8:
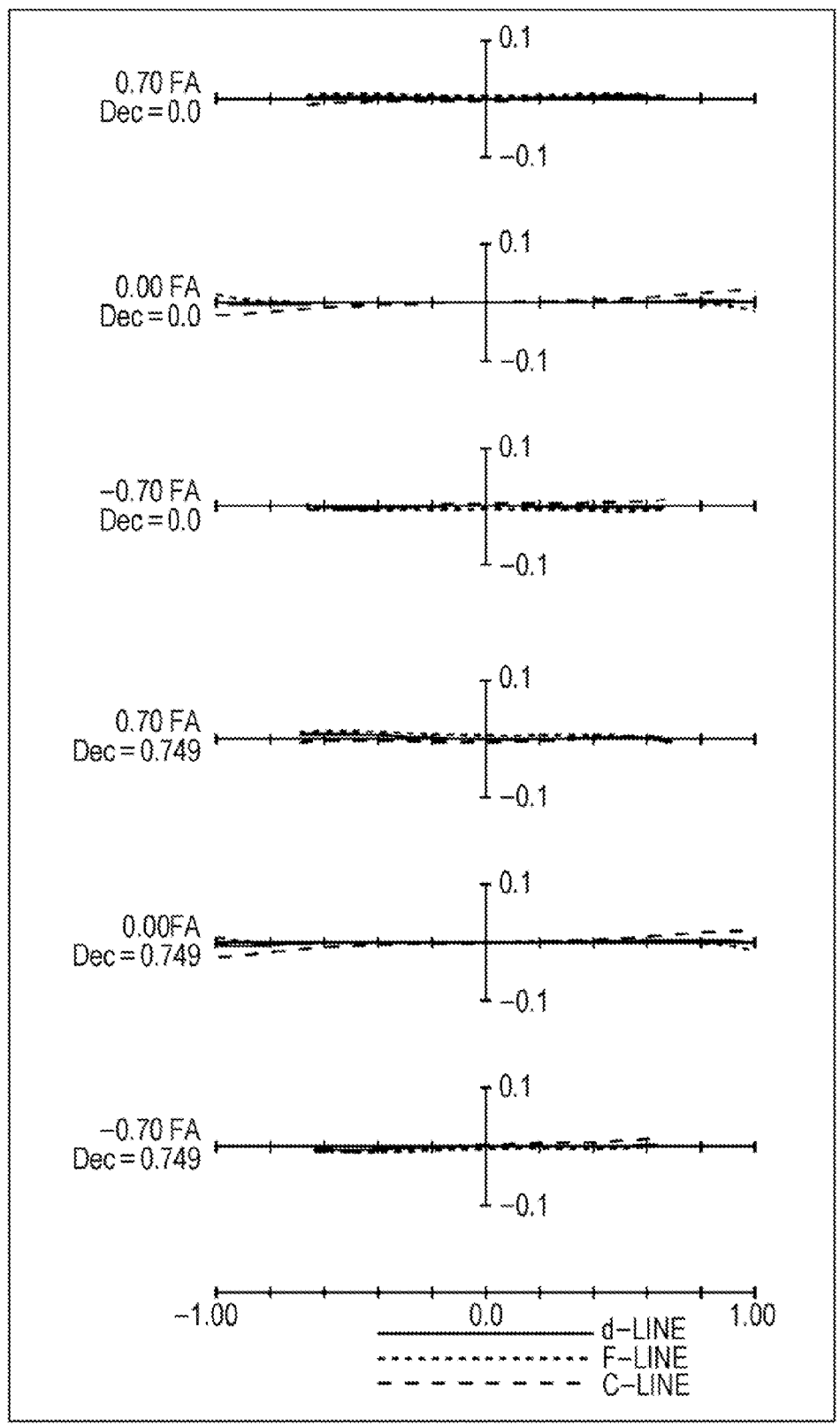
FIG. 8 shows lateral aberration diagrams of the zoom lens system according to the second numerical example at a telephoto end in a basic state in which image stabilization is not being performed and in an image stabilizing state in which the image stabilization is being performed.

As shown in FIG. 5A, FIG. 5B, and FIG. 5C, in a zoom lens system according to a second exemplary embodiment, first lens group G1 is made up of, in order from an object side to an image plane side, first lens element L1 in a negative meniscus shape with a convex surface directed toward the object side, second lens element L2 in a positive meniscus shape with a convex surface directed toward the object side, and third lens element L3 in a positive meniscus shape with a convex surface directed toward the object side. In these lens elements, first lens element L1 and second lens element L2 are cemented.

Second lens group G2 is made up of, in order from the object side to the image plane side, fourth lens element L4 in a negative meniscus shape with a convex surface directed toward the object side, fifth lens element L5 in a positive meniscus shape with a convex surface directed toward the image plane side, sixth lens element L6 in a biconcave shape, and seventh lens element L7 in a positive meniscus shape with a convex surface directed toward the object side.

Third lens group G3 is made up only of eighth lens element L8 in a biconvex shape.

Fourth lens group G4 is made up of, in order from the object side to the image plane side, ninth lens element L9 in a positive meniscus shape with a convex surface directed toward the object side, 10th lens element L10 in a biconcave shape, 11th lens element L11 in a negative meniscus shape with a convex surface directed toward the object side, 12th lens element L12 in a biconvex shape, 13th lens element L13 in a biconvex shape, 14th lens element L14 in a biconcave shape, and 15th lens element L15 in a biconvex shape. In these lens elements, 11th lens element L11 and 12th lens element L12, and 14th lens element L14 and 15th lens element L15 are each cemented. Further, aperture diaphragm A is provided on the image plane side of ninth lens element L9.

Fifth lens group G5 is made up of, in order from the object side to the image plane side, 16th lens element L16 in a biconvex shape and 17th lens element L17 in a biconcave shape. In these lens elements, 16th lens element L16 and 17th lens element are cemented.

Sixth lens group G6 is made up only of 18th lens element L18 in a biconvex shape.

Seventh lens group G7 is made up of, in order from the object side to the image plane side, 19th lens element L19 in a biconcave shape and 20th lens element L20 in a biconvex shape.

Eleventh lens element L11, 12th lens element L12, and 13th lens element L13, which are lens elements constituting fourth lens group G4, correspond to an image stabilizer lens group (to be described later) which moves in the direction perpendicular to an optical axis to optically correct image shake.

When zooming is performed from the wide end to the telephoto end at the time of imaging, third lens group G3 moves monotonically toward the object side, second lens group G2 and sixth lens group G6 move monotonically toward the image plane side, fifth lens group G5 moves along a locus convex toward the image plane side. That is to say, when zooming is performed, the lens groups move along the optical axis in such a manner that the distances between first lens group G1 and second lens group G2, between third lens group G3 and fourth lens group G4, and between fifth lens group G5 and sixth lens group G6 increase, that the distances between second lens group G2 and third lens group G3 and between sixth lens group G6 and seventh lens group G7 decrease, and that the distance between fourth lens group G4 and fifth lens group G5 varies.

Fourth lens group G4 is made up of, in order from the object side to the image side, first sub-lens group G4A (ninth lens element L9) having a positive power, second sub-lens group G4B (10th lens element L10) having a negative power, third sub-lens group G4C (11th lens element L11, 12th lens element L12, and 13th lens element L13) having a positive power, and fourth sub-lens group G4D (14th lens element L14 and 15th lens element L15) having a positive power. Third sub-lens group G4C moves in the direction perpendicular to the optical axis to optically correct image shake. Further, aperture diaphragm A is disposed between first sub-lens group G4A and second sub-lens group G4B. At the time of zooming from the wide end to the telephoto end, there is no change in the distance between first sub-lens group G4A and second sub-lens group G4B, in the distance between second sub-lens group G4B and third sub-lens group G4C, or in the distance between third sub-lens group G4C and fourth sub-lens group G4D.

At the time of focusing from the infinity focusing state to the proximity object focusing state, fifth lens group G5 moves toward the image plane side along the optical axis in any zooming state, and sixth lens group G6 moves toward the object side along the optical axis in any zooming state.

Third Exemplary Embodiment

Figure 9A:
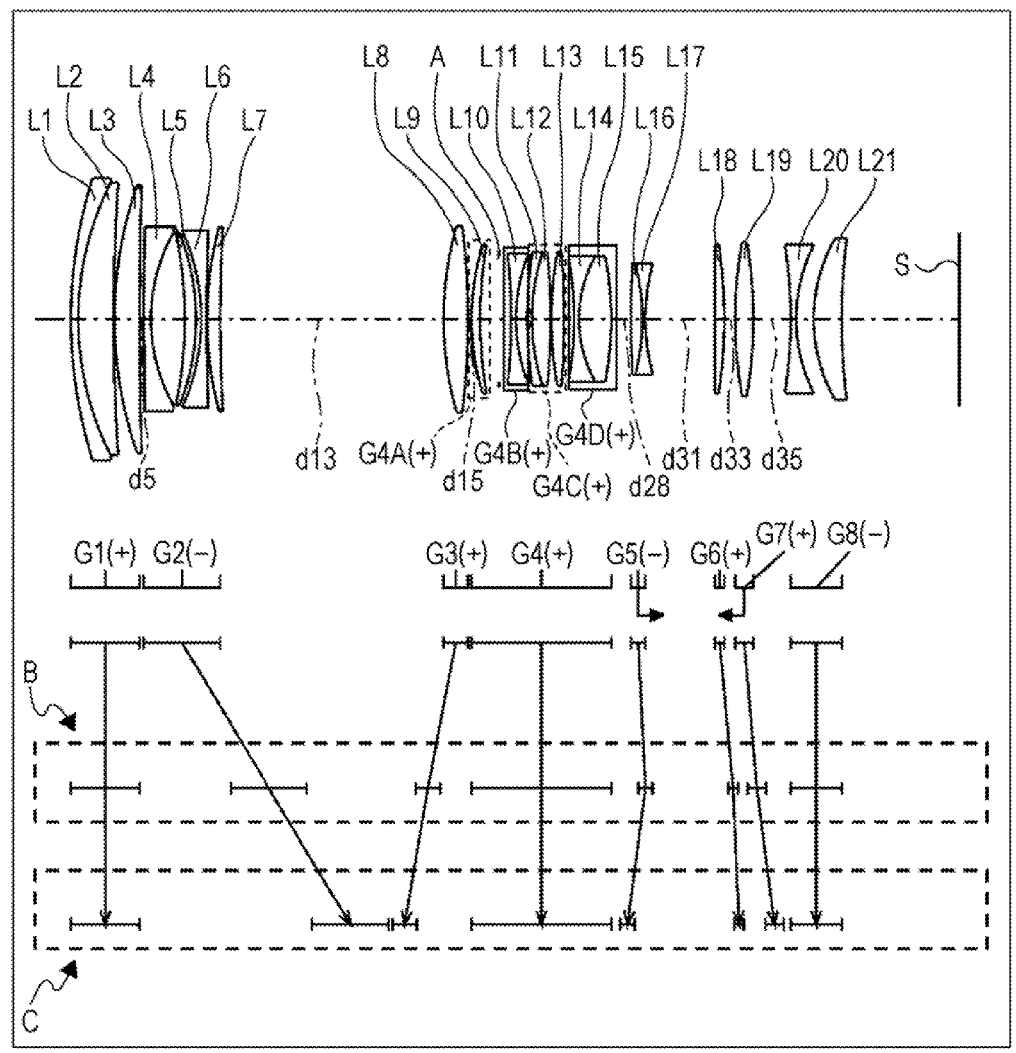
FIG. 9A is a lens arrangement diagram showing an infinity focusing state of a zoom lens system according to a third exemplary embodiment (third numerical example)
Figure 9B:
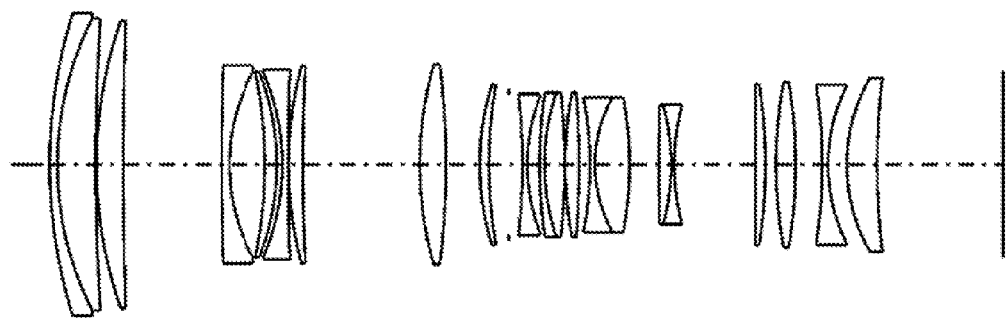
FIG. 9B is a lens arrangement diagram in the state indicated by symbol B in FIG. 9A.
Figure 9C:
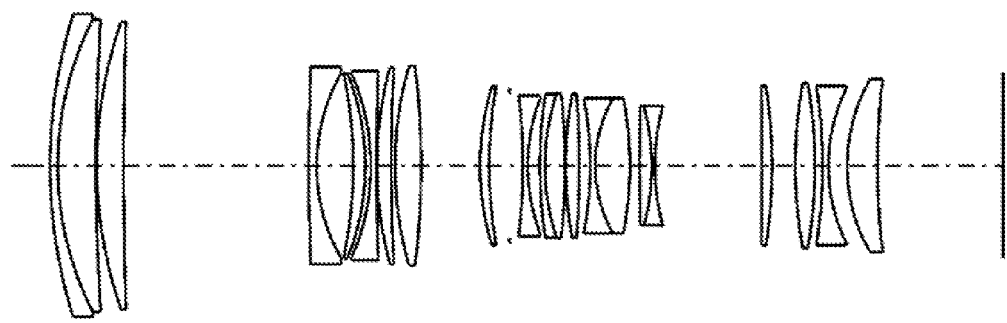
FIG. 9C is a lens arrangement diagram in the state indicated by symbol C in FIG. 9A.
Figure 12:
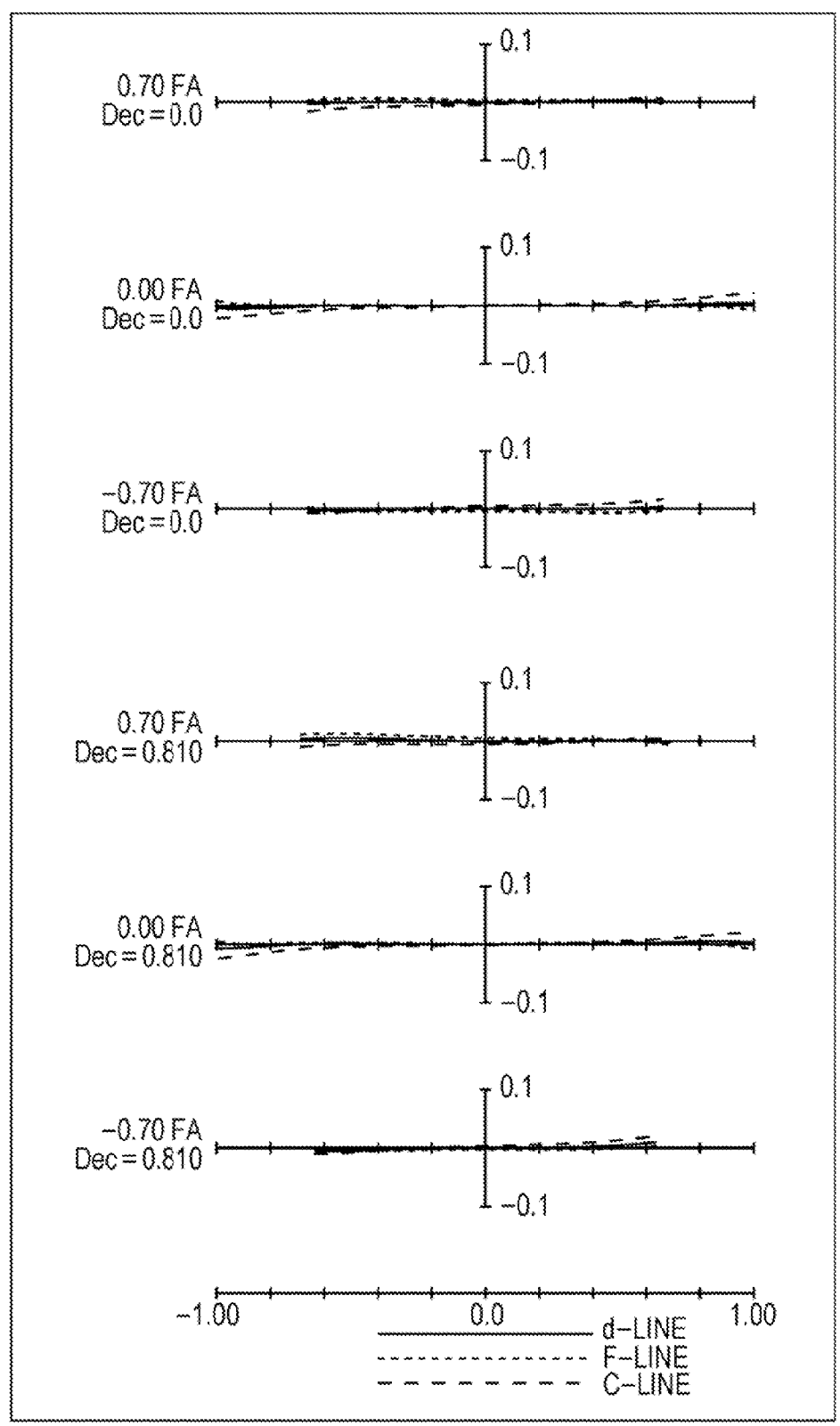
FIG. 12 shows lateral aberration diagrams of the zoom lens system according to the third numerical example at a telephoto end in a basic state in which image stabilization is not being performed and in an image stabilizing state in which the image stabilization is being performed.

As shown in FIG. 9A, FIG. 9B, and FIG. 9C, in a zoom lens system according to a third exemplary embodiment, first lens group G1 is made up of, in order from an object side to an image plane side, first lens element L1 in a negative meniscus shape with a convex surface directed toward the object side, second lens element L2 in a positive meniscus shape with a convex surface directed toward the object side, and third lens element L3 in a positive meniscus shape with a convex surface directed toward the object side. In these lens elements, first lens element L1 and second lens element L2 are cemented.

Second lens group G2 is made up of, in order from the object side to the image plane side, fourth lens element L4 in a negative meniscus shape with a convex surface directed toward the object side, fifth lens element L5 in a positive meniscus shape with a convex surface directed toward the image plane side, sixth lens element L6 in a biconcave shape, and seventh lens element L7 in a positive meniscus shape with a convex surface directed toward the object side.

Third lens group G3 is made up only of eighth lens element L8 in a biconvex shape.

Fourth lens group G4 is made up of, in order from the object side to the image plane side, ninth lens element L9 in a positive meniscus shape with a convex surface directed toward the object side, 10th lens element L10 in a biconcave shape, 11th lens element L11 in a negative meniscus shape with a convex surface directed toward the object side, 12th lens element L12 in a biconvex shape, 13th lens element L13 in a biconvex shape, 14th lens element L14 in a biconcave shape, and 15th lens element L15 in a biconvex shape. In these lens elements, 11th lens element L11 and 12th lens element L12, and 14th lens element L14 and 15th lens element L15 are each cemented. Further, aperture diaphragm A is provided on the image plane side of ninth lens element L9.

Fifth lens group G5 is made up of, in order from the object side to the image plane side, 16th lens element L16 in a biconvex shape and 17th lens element L17 in a biconcave shape. In these lens elements, 16th lens element L16 and 17th lens element are cemented.

Sixth lens group G6 is made up only of 18th lens element L18 in a positive meniscus shape with a convex surface directed toward the image plane side.

Seventh lens group G7 is made up only of 19th lens element L19 in a biconvex shape.

Eighth lens group G8 is made up of, in order from the object side to the image plane side, 20th lens element L20 in a biconcave shape and 21st lens element L21 in a biconvex shape.

Eleventh lens element L11, 12th lens element L12, and 13th lens element L13, which are lens elements constituting fourth lens group G4, correspond to an image stabilizer lens group (to be described later) which moves in the direction perpendicular to an optical axis to optically correct image shake.

When zooming is performed from the wide end to the telephoto end at the time of imaging, third lens group G3 moves monotonically toward the object side, second lens group G2, sixth lens group G6, and seventh lens group G7 move monotonically toward the image plane side, and fifth lens group G5 moves along a locus convex toward the image plane side. That is to say, when zooming is performed, the lens groups move along the optical axis in such a manner that the distances between first lens group G1 and second lens group G2, between third lens group G3 and fourth lens group G4, and between fifth lens group G5 and sixth lens group G6 increase, that the distances between second lens group G2 and third lens group G3 and between seventh lens group G7 and eighth lens group G8 decrease, and that the distances between fourth lens group G4 and fifth lens group G5 and between sixth lens group G6 and seventh lens group G7 vary.

Fourth lens group G4 is made up of, in order from the object side to the image side, first sub-lens group G4A (ninth lens element L9) having a positive power, second sub-lens group G4B (10th lens element L10) having a negative power, third sub-lens group G4C (11th lens element L11, 12th lens element L12, and 13th lens element L13) having a positive power, and fourth sub-lens group G4D (14th lens element L14, 15th lens element L15) having a positive power. Third sub-lens group G4C moves in the direction perpendicular to the optical axis to optically correct image shake. Further, aperture diaphragm A is disposed between first sub-lens group G4A and second sub-lens group G4B. At the time of zooming from the wide end to the telephoto end, there is no change in the distance between first sub-lens group G4A and second sub-lens group G4B, in the distance between second sub-lens group G4B and third sub-lens group G4C, or in the distance between third sub-lens group G4C and fourth sub-lens group G4D.

At the time of focusing from the infinity focusing state to the proximity object focusing state, fifth lens group G5 moves toward the image plane side along the optical axis in any zooming state, and seventh lens group G7 moves toward the object side along the optical axis in any zooming state.

Fourth Exemplary Embodiment

Figure 13B:
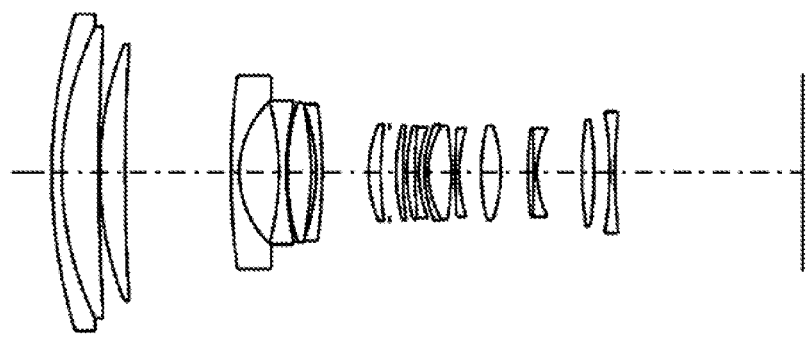
FIG. 13B is a lens arrangement diagram in the state indicated by symbol B in FIG. 13A.
Figure 13C:
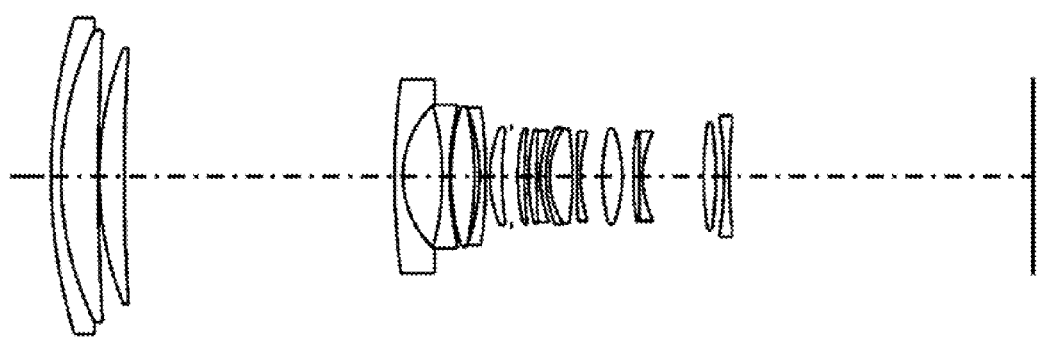
FIG. 13C is a lens arrangement diagram in the state indicated by symbol C in FIG. 13A.
Figure 16:
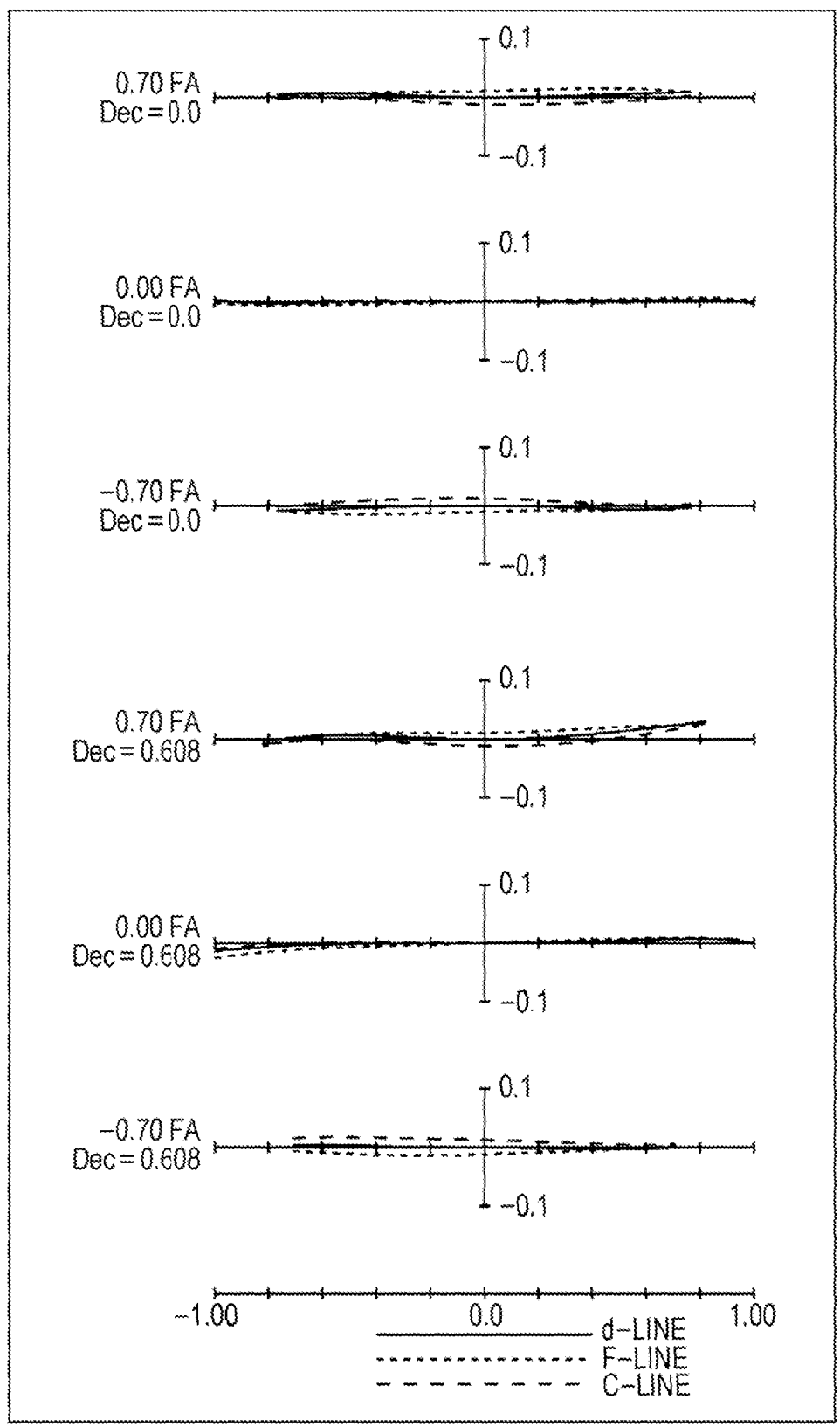
FIG. 16 shows lateral aberration diagrams of the zoom lens system according to the fourth numerical example at a telephoto end in a basic state in which image stabilization is not being performed and in an image stabilizing state in which the image stabilization is being performed.

As shown in FIG. 13A, FIG. 13B, and FIG. 13C, in a zoom lens system according to a fourth exemplary embodiment, first lens group G1 is made up of, in order from an object side to an image plane side, first lens element L1 in a negative meniscus shape with a convex surface directed toward the object side, second lens element L2 in a positive meniscus shape with a convex surface directed toward the object side, and third lens element L3 in a positive meniscus shape with a convex surface directed toward the object side. In these lens elements, first lens element L1 and second lens element L2 are cemented.

Second lens group G2 is made up of, in order from the object side to the image plane side, fourth lens element L4 in a negative meniscus shape with a convex surface directed toward the object side, fifth lens element L5 in a biconcave shape, sixth lens element L6 in a biconvex shape, and seventh lens element L7 in a negative meniscus shape with a convex surface directed to the image plane side. An object-side surface and the image-plane-side surface of fifth lens element L5 are aspherical.

Third lens group G3 is made up of, in order from the object side to the image plane side, eighth lens element L8 in a positive meniscus shape with a convex surface directed toward the object side, ninth lens element L9 in a positive meniscus shape with a convex surface directed toward the object side, 10th lens element L10 in a positive meniscus shape with a convex surface directed toward the object side, 11th lens element L11 in a negative meniscus shape with a convex surface directed toward the object side, 12th lens element L12 in a negative meniscus shape with a convex surface directed toward the object side, 13th lens element L13 in a biconvex shape, 14th lens element L14 in a negative meniscus shape with a convex surface directed toward the object side, and 15th lens element in a biconvex shape. In these lens elements, 10th lens element L10 and 11th lens element L11, and 12th lens element L12 and 13th lens element L13 are each cemented. An image-plane-side surface of ninth lens element L9 and an image-plane-side surface of 13th lens element L13 are aspherical. Further, aperture diaphragm A is provided on the image plane side of eighth lens element L8.

Fourth lens group G4 is made up of, in order from the object side to the image plane side, 16th lens element L16 in a biconvex shape and 17th lens element L17 in a biconcave shape. In these lens elements, 16th lens element L16 and 17th lens element L17 are cemented.

Fifth lens group G5 in the zoom lens system according to the fourth exemplary embodiment is made up only of 18th lens element L18 in a biconvex shape. An object-side surface of 18th lens element L18 is aspherical.

Sixth lens group G6 is made up only of 19th lens element L19 in a biconcave shape. An image-plane-side surface of 19th lens element L19 is aspherical.

Twelfth lens element L12 and 13th lens element L13, which are lens elements constituting third lens group G3, correspond to an image stabilizer lens group (to be described later) which moves in the direction perpendicular to an optical axis to optically correct image shake.

When zooming is performed from the wide end to the telephoto end at the time of imaging, first lens group G1, third lens group G3, fourth lens group G4, fifth lens group G5, and sixth lens group G6 move monotonically toward the object side, and second lens group G2 moves along a locus convex toward the image plane side. That is to say, when zooming is performed, the lens groups move along the optical axis in such a manner that the distances between first lens group G1 and second lens group G2, between fourth lens group G4 and fifth lens group G5, and between sixth lens group G6 and image plane S increase, that the distances between second lens group G2 and third lens group G3 and between fifth lens group G5 and sixth lens group G6 decrease, and that the distance between third lens group G3 and fourth lens group G4 varies.

At the time of focusing from the infinity focusing state to the proximity object focusing state, fourth lens group G4 moves toward the image plane side along the optical axis in any zooming state, and fifth lens group G5 moves toward the object side along the optical axis in any zooming state.

Fifth Exemplary Embodiment

Figure 17B:
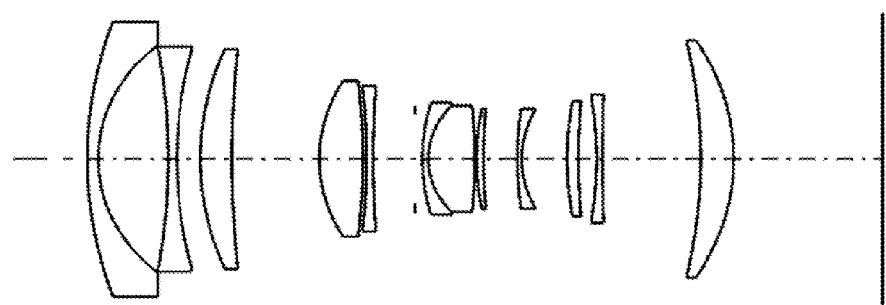
FIG. 17B is a lens arrangement diagram in the state indicated by symbol B in FIG. 17A.
Figure 17C:
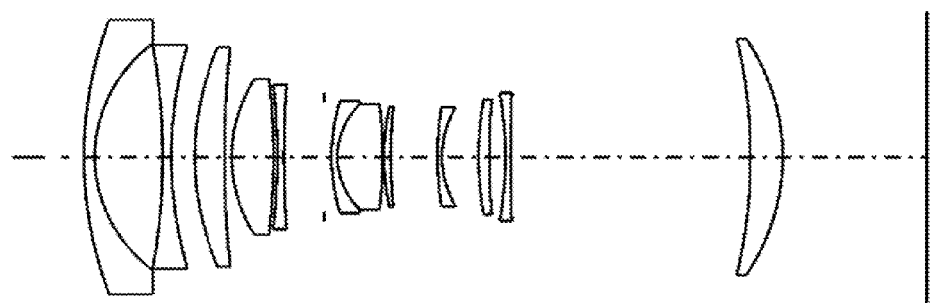
FIG. 17C is a lens arrangement diagram in the state indicated by symbol C in FIG. 17A.
Figure 19A:
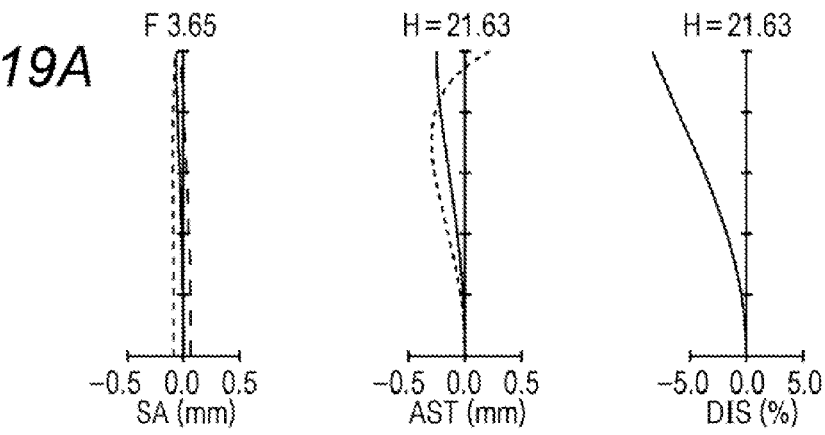
FIGS. 19A, 19B, and 19C are longitudinal aberration diagrams of the zoom lens system according to the fifth numerical example in a proximity object focusing state.
Figure 19B:
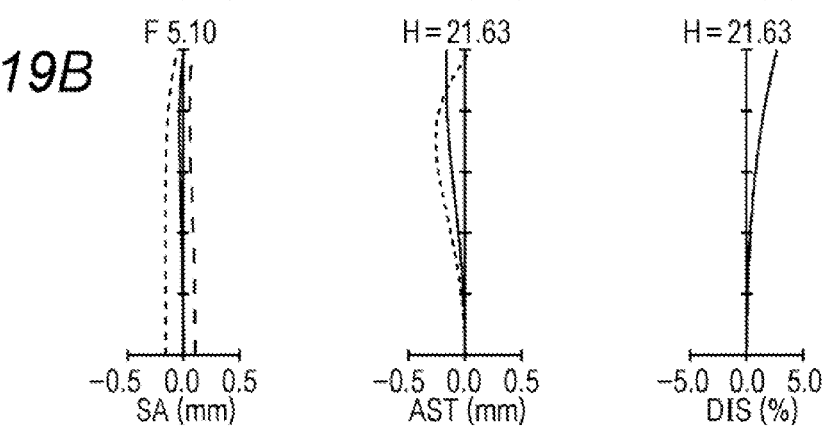
Figure 19C:
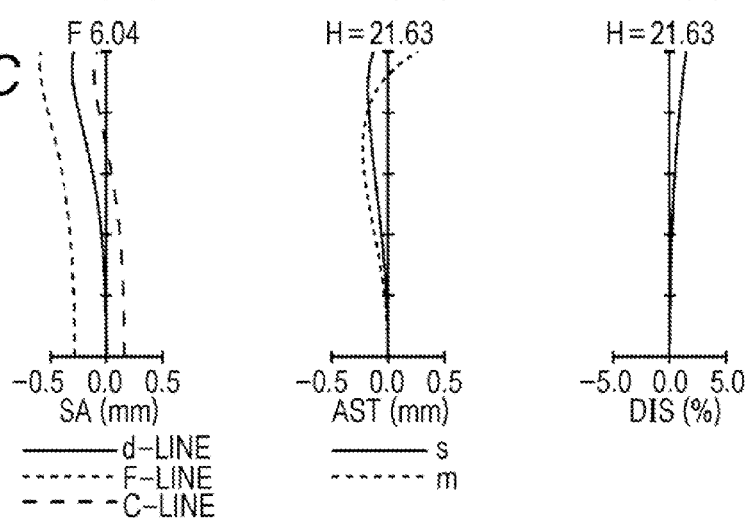

As shown in FIG. 17A, FIG. 17B, and FIG. 17C, in a zoom lens system according to a fifth exemplary embodiment, first lens group G1 is made up of, in order from an object side to an image plane side, first lens element L1 in a negative meniscus shape with a convex surface directed toward the object side, second lens element L2 in a biconcave shape, and third lens element L3 in a positive meniscus shape with a convex surface directed toward the object side.

Second lens group G2 is made up of, in order from the object side to the image plane side, fourth lens element L4 in a biconvex shape, fifth lens element L5 in a biconcave shape, sixth lens element L6 in a negative meniscus shape with a convex surface directed toward the object side, seventh lens element L7 in a biconvex shape, and eighth lens element L8 in a positive meniscus shape with a convex surface directed toward the object side. An object-side surface and an image-plane-side surface of fourth lens element L4 are aspherical. Further, aperture diaphragm A is provided on the image plane side of fifth lens element L5.

Third lens group G3 is made up only of ninth lens element L9 in a negative meniscus shape with a convex surface directed toward the object side.

Fourth lens group G4 is made up only of 10th lens element L10 in a positive meniscus shape with a convex surface directed toward the object side. An object-side surface of 10th lens element L10 is aspherical.

Fifth lens group G5 is made up only of 11th lens element L11 in a biconcave shape.

Sixth lens group G6 is made up only of 12th lens element L12 in a positive meniscus shape with a convex surface directed toward the image plane side.

When zooming is performed from the wide end to the telephoto end at the time of imaging, second lens group G2, third lens group G3, fourth lens group G4, and fifth lens group G5 move monotonically toward the object side, and first lens group G1 moves along a locus convex toward the image plane side. That is to say, when zooming is performed, the lens groups move along the optical axis in such a manner that the distances between second lens group G2 and third lens group G3 and between fifth lens group G5 and sixth lens group G6 increase, that the distance between first lens group G1 and second lens group G2 decreases, and that the distances between third lens group G3 and fourth lens group G4 and between fourth lens group G4 and fifth lens group G5 vary.

At the time of focusing from the infinity focusing state to the proximity object focusing state, third lens group G3 moves toward the image plane side along the optical axis in any zooming state, and fourth lens group G4 moves toward the object side along the optical axis in zooming states between the wide end and the intermediate position.

Sixth Exemplary Embodiment

Figure 20B:
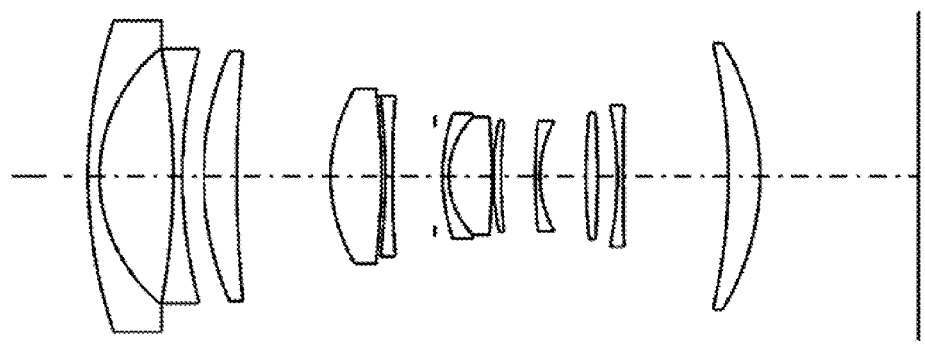
FIG. 20B is a lens arrangement diagram in the state indicated by symbol B in FIG. 20A.
Figure 20C:
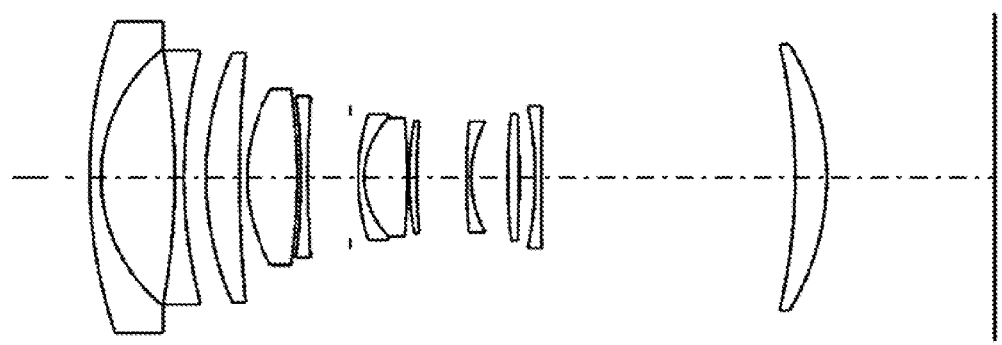
FIG. 20C is a lens arrangement diagram in the state indicated by symbol C in FIG. 20A.
Figure 22A:
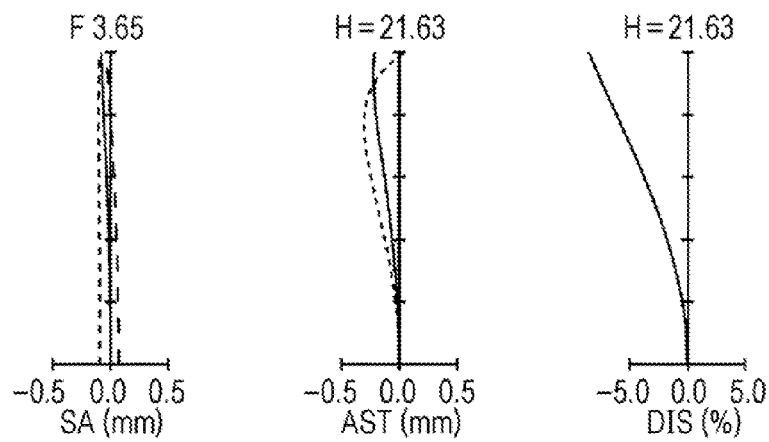
FIGS. 22A, 22B, and 22C are longitudinal aberration diagrams of the zoom lens system according to the sixth numerical example in a proximity object focusing state.
Figure 22B:
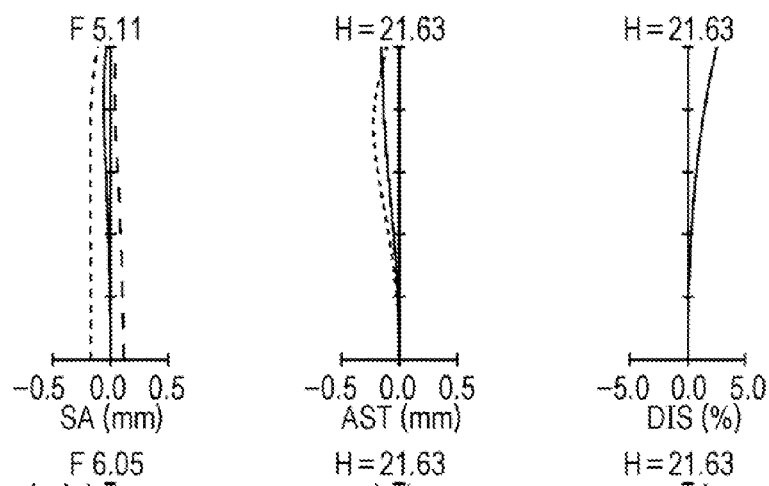
Figure 22C:
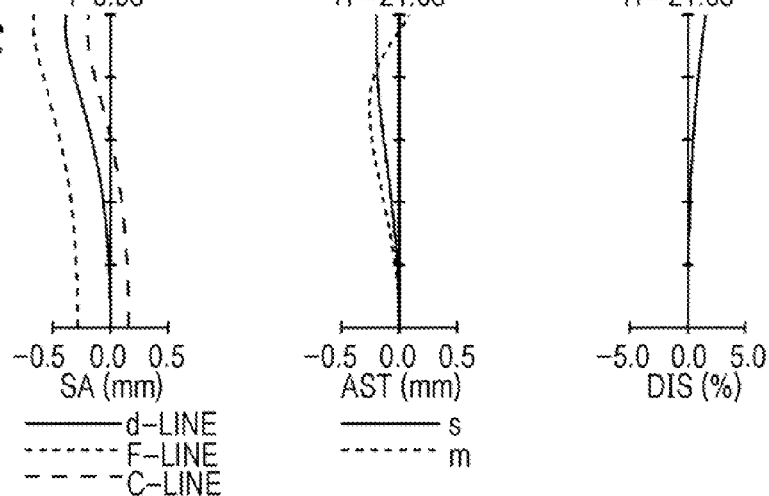

As shown in FIG. 20A, FIG. 20B, and FIG. 20C, in a zoom lens system according to a sixth exemplary embodiment, first lens group G1 is made up of, in order from an object side to an image plane side, first lens element L1 in a negative meniscus shape with a convex surface directed toward the object side, second lens element L2 in a biconcave shape, and third lens element L3 in a positive meniscus shape with a convex surface directed toward the object side.

Second lens group G2 is made up of, in order from the object side to the image plane side, fourth lens element L4 in a biconvex shape, fifth lens element L5 in a biconcave shape, sixth lens element L6 in a negative meniscus shape with a convex surface directed toward the object side, seventh lens element L7 in a biconvex shape, and eighth lens element L8 in a positive meniscus shape with a convex surface directed toward the object side. An object-side surface and an image-plane-side surface of fourth lens element L4 are aspherical. Further, aperture diaphragm A is provided on the image plane side of fifth lens element L5.

Third lens group G3 is made up only of ninth lens element L9 in a negative meniscus shape with a convex surface directed toward the object side.

Fourth lens group G4 is made up only of 10th lens element L10 in a biconvex shape. An object-side surface of 10th lens element L10 is aspherical.

Fifth lens group G5 is made up only of 11th lens element L11 in a biconvex shape.

Sixth lens group G6 is made up only of 12th lens element L12 in a positive meniscus shape with a convex surface directed toward the image plane side.

When zooming is performed from the wide end to the telephoto end at the time of imaging, second lens group G2, third lens group G3, fourth lens group G4, and fifth lens group G5 move monotonically toward the object side, first lens group G1, and sixth lens group G6 move along a locus convex toward the image plane side. That is to say, when zooming is performed, the lens groups move along the optical axis in such a manner that the distances between second lens group G2 and third lens group G3 and between fifth lens group G5 and sixth lens group G6 increase, that the distance between first lens group G1 and second lens group G2 decreases, and that the distances between third lens group G3 and fourth lens group G4, between fourth lens group G4 and fifth lens group G5, and between sixth lens group G6 and image plane S vary.

At the time of focusing from the infinity focusing state to the proximity object focusing state, third lens group G3 moves toward the image plane side along the optical axis in any zooming state, and fourth lens group G4 moves toward the object side along the optical axis in zooming states between the wide end and the intermediate position.

Seventh Exemplary Embodiment

Figure 23A:
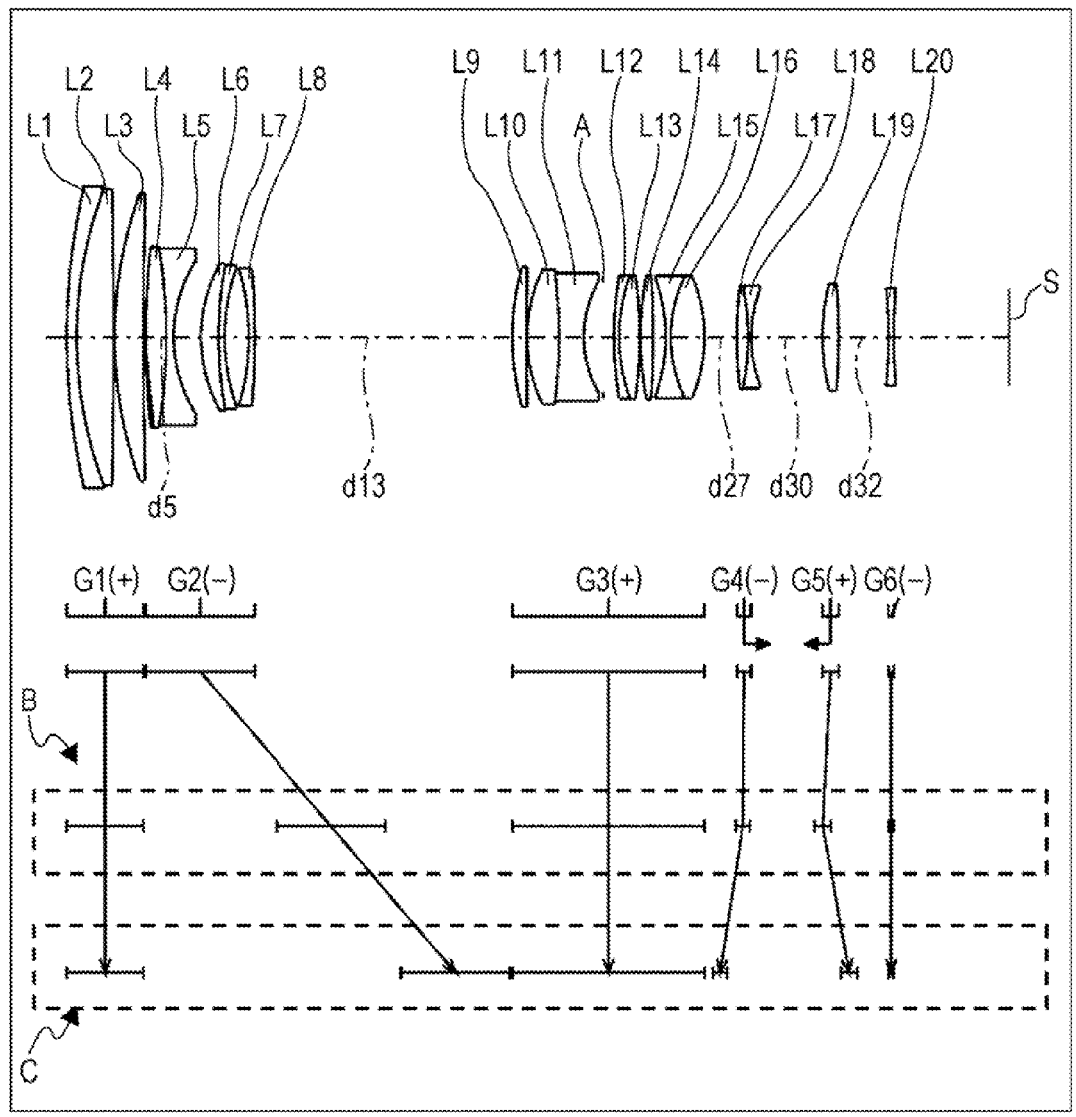
FIG. 23A is a lens arrangement diagram showing an infinity focusing state of a zoom lens system according to a seventh exemplary embodiment (seventh numerical example)
Figure 23B:
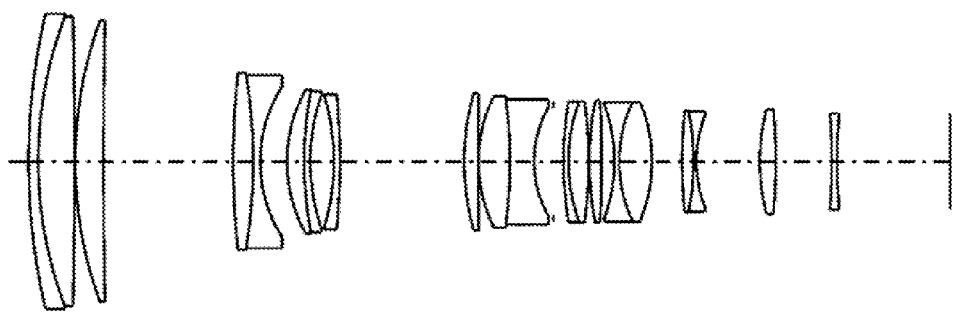
FIG. 23B is a lens arrangement diagram in the state indicated by symbol B in FIG. 23A.
Figure 23C:
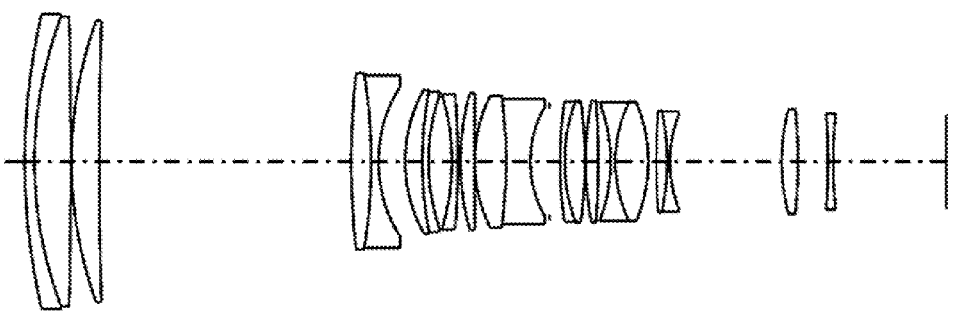
FIG. 23C is a lens arrangement diagram in the state indicated by symbol C in FIG. 23A.
Figure 26:
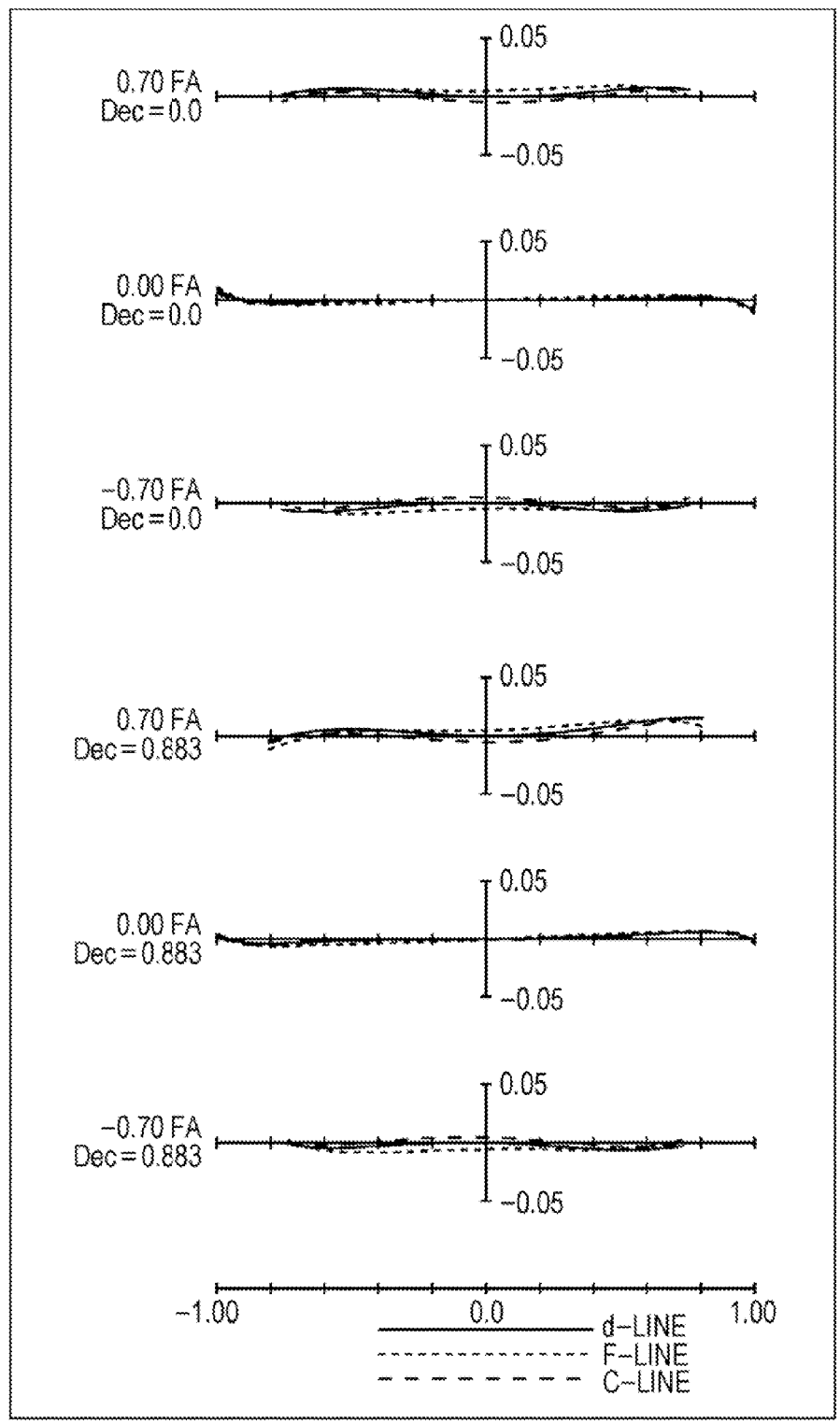
FIG. 26 shows lateral aberration diagrams of the zoom lens system according to the seventh exemplary embodiment at a telephoto end in a basic state in which image stabilization is not being performed and in an image stabilizing state in which the image stabilization is being performed.

As shown in FIG. 23A, FIG. 23B, and FIG. 23C, in a zoom lens system according to a seventh exemplary embodiment, first lens group G1 is made up of, in order from an object side to an image plane side, first lens element L1 in a negative meniscus shape with a convex surface directed toward the object side, second lens element L2 in a biconvex shape, and third lens element L3 in a positive meniscus shape with a convex surface directed toward the object side. In these lens elements, first lens element L1 and second lens element L2 are cemented.

Second lens group G2 is made up of, in order from the object side to the image plane side, fourth lens element L4 in a biconvex shape, fifth lens element L5 in a biconcave shape, sixth lens element L6 in a positive meniscus shape with a convex surface directed toward the object side, seventh lens element L7 in a negative meniscus shape with a convex surface directed toward the object side, and eighth lens element L8 in a negative meniscus shape with a convex surface directed toward the image plane side. In these lens elements, fourth lens element L4 and fifth lens element L5, and sixth lens element L6 and seventh lens element L7 are each cemented.

Third lens group G3 is made up of, in order from the object side to the image plane side, ninth lens element L9 in a positive meniscus shape with a convex surface directed toward the object side, 10th lens element L10 in a biconvex shape, 11th lens element L11 in a biconcave shape, 12th lens element L12 in a negative meniscus shape with a convex surface directed toward the object side, 13th lens element L13 in a biconvex shape, 14th lens element L14 in a biconvex shape, 15th lens element L15 in a biconcave shape, and 16th lens element L16 in a biconvex shape. In these lens elements, 10th lens element L10 and 11th lens element L11, 12th lens element L12 and 13th lens element L13, and 15th lens element L15 and 16th lens element L16 are each cemented. Further, aperture diaphragm A is provided on the image plane side of 11th lens element L11.

Fourth lens group G4 is made up of, in order from the object side to the image plane side, 17th lens element L17 in a biconvex shape and 18th lens element L18 in a biconcave shape. In these lens elements, 17th lens element L17 and 18th lens element L18 are cemented.

Fifth lens group G6 is made up only of 19th lens element L19 in a biconvex shape.

Sixth lens group G6 is made up only of 20th lens element L20 in a biconcave shape. Note that 12th lens element L12, 13th lens element L13, and 14th lens element L14 which are lens elements constituting third lens group G3, correspond to an image stabilizer lens group (to be described later) which moves in the direction perpendicular to an optical axis to optically correct image shake.

When zooming is performed from the wide end to the telephoto end at the time of imaging, second lens group G2 monotonically moves to the image plane side, fourth lens group G4 moves along a locus convex toward the image plane side, fifth lens group G5 moves along a locus convex toward the object side, and first lens group G1, third lens group G, and sixth lens group G6 are fixed with respect to the image plane. That is to say, when zooming is performed, the lens groups move along the optical axis in such a manner that the distance between first lens group G1 and second lens group G2 increases, that the distance between second lens group G2 and third lens group G3 decreases, that the distances between third lens group G3 and fourth lens group G4, between fourth lens group G4 and fifth lens group G5, and between fifth lens group G5 and sixth lens group G6 vary.

At the time of focusing from the infinity focusing state to the proximity object focusing state, fourth lens group G4 moves toward the image plane side along the optical axis in any zooming state, and fifth lens group G5 moves toward the object side along the optical axis in any zooming state.

2. Advantageous Effect

The zoom lens system according to any one of the first to seventh exemplary embodiments includes a plurality of lens groups each of which is made up of at least one lens element, and the zoom lens system is equipped with, in order from an object side to an image side, a front group including a first focusing lens group having a negative power, and a rear group including a second focusing lens group having a positive power. When zooming is performed from a wide end to a telephoto end, the first focusing lens group and the second focusing lens group move along an optical axis, and when focusing is performed from an infinity focusing state to a proximity object focusing state, the first focusing lens group and the second focusing lens group move; thus, an amount of movement of the focusing lens group can be reduced, whereby the lens system can be downsized. In addition, the focusing lens groups are made up of, in order from the object side to the image side, a focusing lens group having a negative power and a focusing lens group having a positive power; thus, field curvatures caused by the focusing movement of the two focusing lens groups can be made to cancel each other without cancelling a focus shift due to the movement of the two focusing lens groups, whereby there is an advantage that the field curvature can be well corrected at any zooming range in the infinity focusing state to the proximity object focusing state.

In the zoom lens system according to any one of the first to seventh exemplary embodiments, aperture diaphragm A is provided, and the first focusing lens group and the second focusing lens group are disposed on the image side of aperture diaphragm A; thus, the focusing lens groups can be made smaller and can be made lighter.

In the zoom lens system according to any one of the first to seventh exemplary embodiments, at the time of focusing from the infinity focusing state to the proximity object focusing state, the first focusing lens group moves toward the image plane side and the second focusing lens group moves toward the object side so that an image position gets close to the image plane side; thus, the amounts of movements of the focusing lenses can be reduced, whereby the lens can be downsized.

In the zoom lens system according to any one of the first to seventh exemplary embodiments, at the time of zooming from the wide end to the telephoto end, the first focusing lens group moves along a locus convex toward the image plane side; thus, it is possible to reduce spherical aberration from the wide end to the telephoto end.

In the zoom lens system according to any one of the first to seventh exemplary embodiments, at the time of zooming from the wide end to telephoto end, the second focusing lens group moves toward the lens group which is adjacent to and on the image side of the second focusing lens group; thus, the comatic aberration can be reduced from the wide end to the telephoto end.

In the zoom lens system according to any one of the first to seventh exemplary embodiments, the second focusing lens group is made up only of a single lens element having a positive power; thus, the second focusing lens group can be made lighter, whereby an actuator for driving the focusing lens group or other components can be downsized, and the lens barrel can be made smaller.

In the zoom lens system according to the first to fourth and seventh exemplary embodiments, the first focusing lens group is made up of a cemented lens which has, in order from the object, a single lens element having a positive power and a single lens element having a negative power; thus, the first focusing lens group can be made lighter, whereby an actuator or the like can be downsized, and the lens barrel can be made smaller.

In the zoom lens system according to the first to fourth and seventh exemplary embodiments, the first lens group, which is located on the most object side, has a positive power; thus, a diameter of the aperture diaphragm A can be made small, whereby a diameter of the lens barrel can be smaller.

In the zoom lens system according to the first to third and seventh exemplary embodiments, at the time of zooming from the wide end to the telephoto end, first lens group is fixed with respect to the image plane; thus, there is no need for a gap in the lens barrel which needs to be provided if the first lens group is movable, whereby dust is prevented from entering.

In the zoom lens system according to the first to third exemplary embodiments, at least two lens groups which move at the time of zooming from the wide end to the telephoto end are provided between the first lens group, which is located on the most object side, and aperture diaphragm A; thus, it is possible to well correct the aberrations, especially the spherical aberration, at any zoom position from the wide end to the telephoto end.

In the zoom lens system according to the first to fourth exemplary embodiments, the front group includes, on the object side of the first focusing lens group and in order from the object side to the image side, first lens group G1 having a positive power, second lens group G2 having a negative power and third lens group G3 having a positive power; thus, it is possible to well correct the aberrations at any zoom position from the wide end to the telephoto end. In addition, the focusing lens group can be made lighter; therefore, an actuator for driving the focusing lens group or other components can be downsized, and the diameter of the lens barrel can be made smaller.

In the zoom lens system according to first to third exemplary embodiments, third lens group G3 is made up of a single lens element having a positive; thus, the third lens group can be made lighter, and the third lens group can be easily fixed at the time of manufacturing.

In the zoom lens system according to first to third exemplary embodiments, in the front group, the lens group which is adjacent to and on the object side of the first focusing lens group includes, in order from the object side to the image side: the first sub-lens group having a positive power; aperture diaphragm A; the second sub-lens group having a negative power; the third sub-lens group which has a positive power and performs image stabilization by moving in the direction perpendicular to the optical axis; and the fourth sub-lens group. When image stabilization is being performed, the first sub-lens group can reduce the generation of the aberrations and can reduce the amount of movement required to perform the image stabilization, whereby the diameter of the lens barrel can be downsized.

The zoom lens system according to the first exemplary embodiment includes variable light aperture diaphragm VA, which changes the diameter at the time of zooming from the wide end to the telephoto end, adjacent to and on the image plane side of the image stabilizer sub-lens group, which is in the lens group adjacent to and on the object side of the first focusing lens group. With this arrangement, an upper light beam of an off-axis light beam can be blocked at different zoom positions from the wide end to the telephoto end; thus, the upper light beam can be blocked at the different zoom positions, whereby the aberrations at an intermediate image height can be reduced at the different zoom positions.

In the zoom lens system according to the first to third and seventh exemplary embodiments, the image stabilizer sub-lens group is made up of, in order from the object, the cemented lens made up of a lens having a negative power and a lens having a positive power, and the single lens having a positive power; thus, it is possible to reduce the generation of the aberrations when image stabilization is being performed.

In the zoom lens system according to the first to seventh exemplary embodiments, each lens group moves along the optical axis, at the time of zooming, such that all of the distances between the lens groups changes. In the zoom lens system according to each exemplary embodiment, the power is distributed to the lens groups in a desired manner, so that the zoom lens system can have a high optical performance from the infinity focusing state to the proximity object focusing state and can have a short overall length and a small outer diameter.

The first to seventh exemplary embodiments are described above as examples of the technologies disclosed in the present application. However, the technologies of the present disclosure not only apply to the above exemplary embodiments but also can apply to exemplary embodiments in which modification, replacement, addition, or removal is appropriately is made.

In the following, conditions will be described which can be satisfied by lens systems such as the lens systems according to the first to seventh exemplary embodiments. Note that a plurality of possible conditions will be defined for the lens systems according to the exemplary embodiments, and the most effective lens construction is a lens construction which satisfies all the plurality of conditions. However, by satisfying individual conditions, it is also possible to achieve lens systems having the corresponding effects.

For example, a zoom lens system according to any one of the first to seventh exemplary embodiments includes a plurality of lens groups each of which is made up of at least one lens element, and the zoom lens system is equipped with, in order from an object side to an image plane side: a front group including a first focusing lens group having a negative power; and a rear group including a second focusing lens group having a positive power, wherein when zooming is performed from a wide end to a telephoto end, the first focusing lens group and the second focusing lens group move along an optical axis, the first focusing lens group and the second focusing lens group move to perform the focusing when focusing is performed from an infinity focusing state to a proximity object focusing state (hereinafter, this lens construction is referred to as a basic construction of an exemplary embodiment), and the following conditional expression (1) is preferably satisfied:

$$-20 < \beta1t/\beta1w \times \beta2t/\beta2w < 20 \tag{1}$$

where:

$\beta1t$ is a lateral magnification of the first focusing lens group at the telephoto end;

$\beta1w$ is a lateral magnification of the first focusing lens group at the wide end;

$\beta2t$ is a lateral magnification of the second focusing lens group at the telephoto end; and $\beta2w$ is a lateral magnification of the second focusing lens group at the wide end.

The conditional expression (1) is a condition specifying contribution of the first focusing lens group and the second focusing lens group to zooming. If the conditional expression (1) is satisfied, the overall length is short, and at the same time, generation of the aberrations can be reduced. If the lower limit of the conditional expression (1) is exceeded, the focusing lens group bears a smaller part of zooming, and other groups thus have to bear the zooming, whereby the overall length is longer. In contrast, if the upper limit of the conditional expression (1) is exceeded, the focusing lens group bears zooming too much, and the focusing lens group thus generates a larger spherical aberration, which lowers the performance. In addition, if at least one of the following conditional expressions (1)' and (1)" is also satisfied, the above advantageous effects can be more improved.

$$1.05 < \beta1t/\beta1w \times \beta2t/\beta2w \tag{1'}$$

$$\beta1t/\beta1w \times \beta2t/\beta2w < 2.00 \tag{1"}$$

The zoom lens system preferably has such a basic construction as the zoom lens systems according to, for example, the first to seventh exemplary embodiments have, and the zoom lens system preferably satisfies the following conditional expression (2):

$$0.25 < |f1/f2| < 1.30 \tag{2}$$

where:

f1 is a focal length of the first focusing lens group; and f2 is a focal length of the second focusing lens group.

The conditional expression (2) is a condition specifying a power ratio between the first focusing lens group and the second focusing lens group. If the conditional expression (2) is satisfied, the lens barrel can be downsized, and in addition, an amount of the field curvature can be reduced. If the lower limit of the conditional expression (2) is exceeded, the power of the first focusing lens group is too strong, and the diameter of the second focusing lens group is thus larger, whereby the second focusing lens group is heavier; therefore, the actuator needs to be bigger, so that the diameter of the lens barrel is larger. In contrast, the upper limit of the conditional expression (2) is exceeded, it is impossible to correct the field curvature, which is cancelled by the first focusing lens group and the second focusing lens group moving with respect to each other; thus, the field curvature at the time of shooting at the shortest photographing distance is larger. In addition, if at least one of the following conditional expressions (2)' and (2)" is also satisfied, the above advantageous effects is further improved:

$$0.50 < |f1/f2| \tag{2'}$$

$$|f1/f2| < 1.20 \tag{2"}$$

The zoom lens system preferably has such a basic construction as the zoom lens systems according to, for example, the first, second, third, fifth, and sixth exemplary embodiments have; and it is preferable for the following conditional expression to be satisfied by the lens which has the strongest positive power in the lens elements constituting the second focusing lens group:

$$\nu p2 < 30 \tag{3}$$

where:

$\nu p2$ is the Abbe number of the lens which has the strongest positive power in the lens elements constituting the second focusing lens group.

The conditional expression (3) specifies the Abbe number of the lens which has the strongest positive power in the lens elements constituting the second focusing lens group. If the conditional expression (3) is satisfied, the chromatic aberration is well corrected at different zoom positions. If the upper limit of the conditional expression (3) is exceeded, the chromatic aberration cannot be well corrected from the wide end to the telephoto end.

The zoom lens system preferably has such a basic construction as the zoom lens systems according to, for example, the first to fourth and seventh exemplary embodiments have, and the first focusing lens group is preferable made up of at least a single lens element having a positive power and a single lens element having a negative power; and the following conditional expression (4) is preferably satisfied:

$$\nu p1 < 30 \quad (4)$$

where:

νp1 is the Abbe number of the lens which has the strongest positive power in the lenses constituting the first focusing lens group.

The conditional expression (4) specifies the Abbe number of the lens which has the strongest positive power in the lenses constituting the first focusing lens group. If the conditional expression (4) is satisfied, the chromatic aberration is well corrected from the infinity focusing state to the proximity object focusing state. If the upper limit is exceeded, the chromatic aberration cannot be well corrected from the infinity to the closest photographing distance.

The zoom lens system preferably has such a basic construction as the zoom lens system according to, for example, the first to sixth exemplary embodiments, and it is preferable for the following conditional expression (5) to be satisfied.

$$mf2w/mf1w > mf2t/mf1t \quad (5)$$

where:

mf2w is an amount of movement of the second focusing lens group at the wide end when focusing is performed from the infinity to an object at any certain distance;

mf1w is an amount of movement of the first focusing lens group at the wide end when focusing is performed from the infinity to an object at the certain distance;

mf2t is an amount of movement of the second focusing lens group at the telephoto end when focusing is performed from the infinity to an object at the certain distance; and mf1t is an amount of movement of the first focusing lens group at the telephoto end when focusing is performed from the infinity to an object at the certain distance.

The conditional expression (5) specifies a ratio between the movement amounts of the first focusing lens group and the second focusing lens group at the wide end and the telephoto end. If the conditional expression (5) is satisfied, the aberrations are well corrected at different zoom positions. In particular, the spherical aberration can be well corrected. If the conditional expression (5) is not satisfied, the aberrations cannot be corrected at different zoom positions from the infinity to the shortest photographing distance.

The lens groups constituting the zoom lens systems according to the first to seventh exemplary embodiments are made up of only refractive lens elements (that is, lens elements of the type in which light is deflected on an interface between media having different refractive indices) which deflect an incident light beams by refraction; however, the present disclosure is not limited to this configuration. For example, the lens groups may be made up of diffractive lens elements which deflect an incident light beam by diffraction; refractive-diffractive hybrid lens elements which deflects an incident light beam by a combination of a diffractive action and a refractive action; gradient index lens elements which deflect an incident light beam by the action of distribution of refractive index; or other components. In particular, in the refractive-diffractive hybrid lens element, a wavelength dependency of diffraction efficiency is preferably improved by a diffraction structure formed on the interface between media having different refractive indices.

Eighth Exemplary Embodiment

Figure 27:
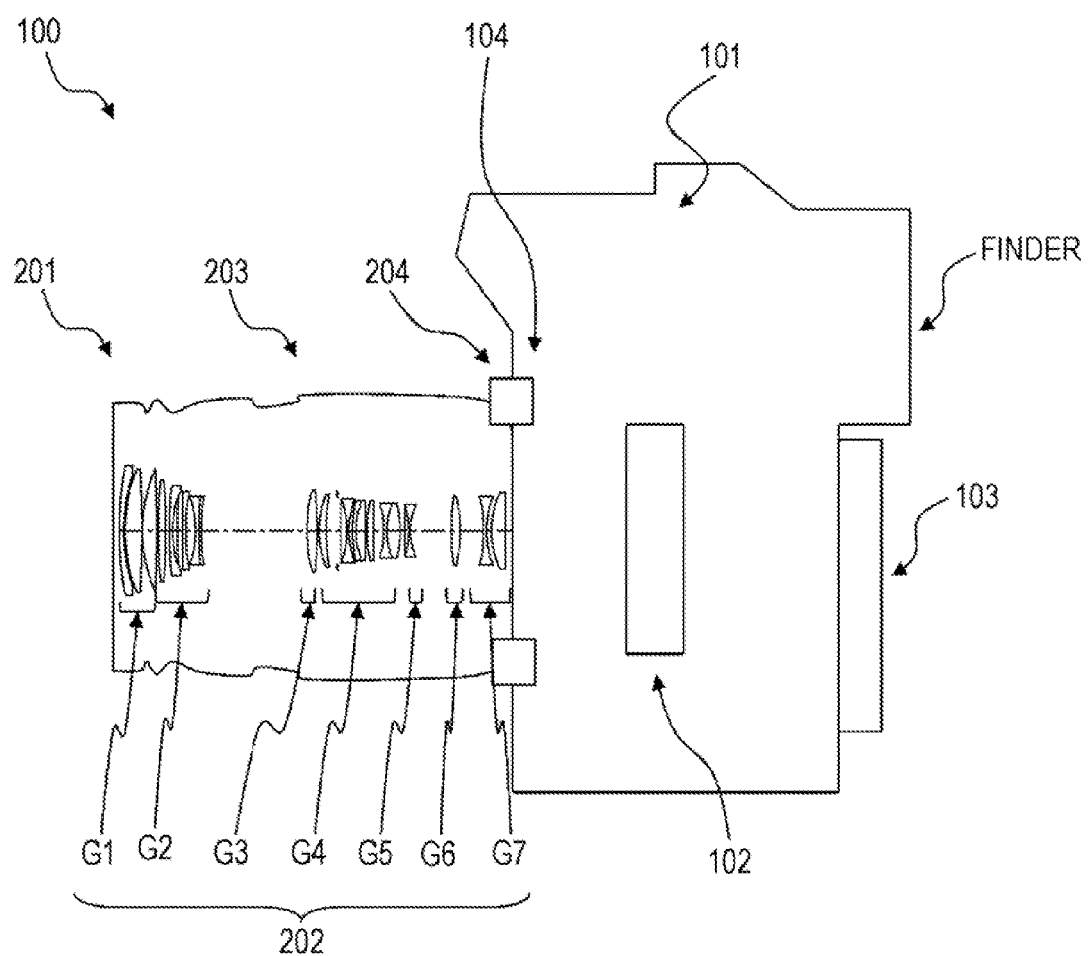
FIG. 27 is a schematic configuration diagram of an interchangeable lens digital camera system according to an eighth exemplary embodiment.

FIG. 27 is a schematic configuration diagram of an interchangeable lens digital camera system according to an eighth exemplary embodiment.

Interchangeable lens digital camera system 100 according to the present exemplary embodiment is equipped with camera body 101, and interchangeable lens device 201 detachably connected to camera body 101.

Camera body 101 includes imaging element 102 which receives an optical image formed by zoom lens system 202 of interchangeable lens device 201, and converts the optical image to an electric image signal, liquid crystal monitor 103 which displays the image signal converted by imaging element 102, and a camera mount 104. Interchangeable lens device 201 includes zoom lens system 202 according to any one of the first to sixth exemplary embodiments, lens barrel 230 holding zoom lens system 202, and lens mount 204 which is to be connected to camera mount 104 of a camera body. Camera mount 104 and lens mount 204 not only are used for physical connection but also function as interfaces which electrically couple a controller (not shown) in camera body 101 and a controller (not shown) in interchangeable lens device 201 to enable the controllers to send and receive a signal to and from each other. Note that FIG. 23 shows the case that the zoom lens system according to the first exemplary embodiment is used as zoom lens system 202.

Since the present exemplary embodiment uses the zoom lens system 202 according to any one of the first to seventh exemplary embodiment, it is possible to accomplish a downsized interchangeable lens device having an excellent imaging performance at low cost. In addition, it is possible to accomplish downsizing of and improvement in the performance of interchangeable lens digital camera system 100, as a whole, according to the present exemplary embodiment. However, it is not necessary to use all of the zooming range of the zoom lens system according to any one of the first to sixth exemplary embodiment. Specifically, it is possible to cut out, depending on an intended zooming range, a part of the zooming range in which the optical performance is secured, so that the zoom lens system can be used as a zoom lens system having a lower magnification than the zooming lens system described in the following corresponding first to sixth numerical examples.

3. Numerical Examples

In the following, numerical examples which specifically practice the zoom lens systems according to the first to sixth exemplary embodiments will be described. In the numerical examples, the units used for lengths in the tables are all "mm", and the units for the angles of view are all "° (degree)". In addition, in the numerical examples, r is a radius of curvature, d is a surface interval, nd is a refractive index for the d-line, νd is the Abbe number for the d-line. Further, in the numerical examples, the surfaces having the symbol * are aspherical, and the aspherical surface shape is defined by the following mathematical expression 2.

$$Z = \frac{h^2/r}{1+\sqrt{1-(1+\kappa)(h/r)^2}} + \sum A_n h^n \quad \text{Mathematical Expression 2}$$

where:

Z is a distance from a point on the aspherical surface to a tangential plane of an apex of the aspherical surface at a height h from the optical axis;

h is the height from the optical axis;

r is a radius of curvature of the apex,

κ is a conical coefficient; and

An is an n-th order aspherical coefficient.

FIGS. 2A, 2B, and 2C, FIGS. 6A, 6B, and 6C, FIGS. 10A, 10B, and 10C, FIGS. 14A, 14B, and 14C, FIGS. 18A, 18B, and 18C, FIGS. 21A, 21B, 21C, and FIGS. 24A, 24B, and 24C are drawings respectively showing longitudinal aberration diagrams of the zoom lens system according to the first to seventh numerical examples, in the infinity focusing state. FIGS. 3A, 3B, and 3C, FIGS. 7A, 7B, and 7C, FIGS. 11A, 11B, and 11C, FIGS. 15A, 15B, and 15C, FIGS. 19A, 19B, and 19C, FIGS. 22A, 22B, and 22C, and FIGS. 25A, 25B, and 25C are drawings respectively showing longitudinal aberration diagrams of the zoom lens system according to the first to seventh numerical examples, in the proximity object focusing state. Note that object distances of the numerical examples are as follows:

First numerical example . . . 1200 mm;
Second numerical example . . . 800 mm;
Third numerical example . . . 800 mm;
Fourth numerical example . . . 550 mm;
Fifth numerical example . . . 300 mm;
Sixth numerical example . . . 300 mm; and
Seventh numerical example . . . 1000 mm.

The longitudinal aberration diagrams in FIGS. 2A, 3A, 6A, 7A, 10A, 11A, 14A, 15A, 18A, 19A, 21A, 22A, 24A, and 25A show the aberrations at the wide end. The longitudinal aberration diagrams FIGS. 2B, 3B, 6B, 7B, 10B, 11B, 14B, 15B, 18B, 19B, 21B, 22B, 24B, and 25B show the aberrations at the intermediate position. The longitudinal aberration diagrams FIGS. 2C, 3C, 6C, 7C, 10C, 11C, 14C, 15C, 18C, 19C, 21C, 22C, 24C, and 25C show the aberrations at the telephoto end. In the above longitudinal aberration diagrams, the graphs show, in order from the left side, the spherical aberration SA (mm), the astigmatism AST (mm), and the distortion DIS (%). In each of the spherical aberration diagrams, the vertical axis represents an f-number (denoted by F in the diagram), the solid line, the short broken line, and the long broken line respectively show the characteristics for the d-line, the F-line, and the C-line. In each of the astigmatism diagrams, the vertical axis represents the image height (denoted by H in the drawing), and the solid line and the broken line respectively represent the characteristics on the sagittal plane (indicated by s in the diagram) and the meridional plane (indicated by m in the diagram). In each of the distortion diagrams, the vertical axis represents the image height (denoted by H in the diagram).

FIG. 4, FIG. 8, FIG. 12, FIG. 16, and FIG. 26 each are lateral aberration diagrams, at the telephoto end, of the zoom lens system according to each of the first to fourth and seventh numerical examples.

In each of the lateral aberration diagrams, the upper three aberration diagrams correspond to a basic state at the telephoto end, in which image stabilization is not performed, and the lower three aberration diagrams correspond to an image stabilizing state, at the telephoto end in which the image stabilizer lens group is moved in the direction perpendicular to the optical axis by a certain distance, where the image stabilizer lens group is: 14th lens element L14, 15th lens element L15, and 16th lens element L16 in fourth lens group in the case of the first numerical example; 11th lens element L11, 12th lens element L12, and 13th lens element L13 in fourth lens group G4 in the case of the second and third numerical examples; and 12th lens element L12 and 13th lens element L13 in third lens group G3 in the case of the fourth numerical example. In the lateral aberration diagrams in the basic state, the upper graph, the middle graph, and the lower graph respectively correspond to the lateral aberrations at the image points of 70% of the maximum image height, at the image point on the optical axis, and at the image point of −70% of the maximum image height. In the lateral aberration diagrams in the image stabilization state, the upper graph, the middle graph, and the lower graph respectively correspond to the lateral aberrations at the image points of 70% of the maximum image height, at the image point on the optical axis, and at the image point of −70% of the maximum image height. Further, in each of the lateral aberration diagrams, the horizontal axis represents a distance from the principal ray on the pupil plane, and the solid line, the short broken line, and the long broken line respectively represent the characteristics for the d-line, the F-line, and the C-line. In each of the lateral aberration diagrams, the meridional plane is defined by the plane including the optical axis of first lens group G1 and the optical axis of the image stabilizer lens group. In each of the zoom lens system of the numerical examples, the displacement distance of the image stabilizer lens group, in the direction perpendicular to the optical axis, in the image stabilizing state at the telephoto end is as follows:

First numerical example . . . 0.9000 mm;
Second numerical example . . . 0.7486 mm;
Third numerical example . . . 0.8102 mm;
Fourth numerical example . . . 0.6081 mm; and
Seventh numerical example . . . 0.8829 mm.

An amount of image eccentricity of a zoom lens system which is at a photographing distance of ∞ at the telephoto end and is inclined by a predetermined angle is equal to an amount of image eccentricity when the image stabilizer lens group is parallely displaced in the direction vertical to the optical axis by each of the above-listed values.

As apparent from the lateral aberration diagrams, the lateral aberration at an on-axis image point is well symmetric. Further, the comparison of the lateral aberration at the +70% image point and the lateral aberration at the −70% image point between the basic state and the image stabilizing state shows that curvature is small in both states, and the gradients of the aberration curve lines are approximately the same between both states, which fact shows that eccentricity comatic aberration and eccentricity astigmatism are small. This means that sufficiently high imaging performance is achieved even in the image stabilizing state. Further, if the image stabilization angle of the zoom lens system is fixed, the smaller amount of parallel displacement is required for the image stabilization as the overall focal length of the zoom lens system is shorter. Therefore, it is possible to perform sufficient image stabilization at any zoom position with respect to any image stabilization angle up to the predetermined angle without deteriorating the imaging performance.

First Numerical Example

The zoom lens system of the first numerical example corresponds to the first exemplary embodiment shown in FIG. 1A to FIG. 1C. The surface data of the zoom lens system of the first numerical example are shown in FIG. 28, the various data in the infinity focusing state are shown in FIG. 29, the data of the zooming lens group are shown in FIG. 30, and the various data in the proximity object focusing state are shown in FIG. 31.

Second Numerical Example

The zoom lens system of the second numerical example corresponds to the second exemplary embodiment shown in FIG. 5A to FIG. 5C. The surface data of the zoom lens system of the second numerical example are shown in FIG.

32, the various data in the infinity focusing state are shown in FIG. 33, the data of the zooming lens group are shown in FIG. 34, and the various data in the proximity object focusing state are shown in FIG. 35.

Third Numerical Example

The zoom lens system of the third numerical example corresponds to the third exemplary embodiment shown in FIG. 9A to FIG. 9C. The surface data of the zoom lens system of the third numerical example are shown in FIG. 36, various data in the infinity focusing state are shown in FIG. 37, the data of the zooming lens group are shown in FIG. 38, and the various data in the proximity object focusing state are shown in FIG. 39.

Fourth Numerical Example

The zoom lens system of the fourth numerical example corresponds to the fourth exemplary embodiment shown in FIG. 13A to FIG. 13C. The surface data of the zoom lens system of the fourth numerical example are shown in FIG. 40, the aspherical data are shown in FIG. 41, various data in the infinity focusing state are shown in FIG. 42, the data of the zooming lens group are shown in FIG. 43, and the various data in the proximity object focusing state are shown in FIG. 44.

Fifth Numerical, Example

The zoom lens system of the fifth numerical example corresponds to the fifth exemplary embodiment shown in FIG. 17A to FIG. 17C. The surface data of the zoom lens system of the fifth numerical example are shown in FIG. 45, the aspherical data are shown in FIG. 46, various data in the infinity focusing state are shown in FIG. 47, the data of the zooming lens group are shown in FIG. 48, and the various data in the proximity object focusing state are shown in FIG. 49.

Sixth Numerical Example

The zoom lens system of the sixth numerical example corresponds to the sixth exemplary embodiment shown in FIG. 20A to FIG. 20C. The surface data of the zoom lens system of the sixth numerical example are shown in FIG. 50, the aspherical data are shown in FIG. 51, various data in the infinity focusing state are shown in FIG. 52, the data of the zooming lens group are shown in FIG. 53, and the various data in the proximity object focusing state are shown in FIG. 54.

Seventh Numerical Example

The zoom lens system of the seventh numerical example corresponds to the seventh exemplary embodiment shown in FIG. 23A to FIG. 23C. The surface data of the zoom lens system of the seventh numerical example are shown in FIG. 55, various data in the infinity focusing state are shown in FIG. 56, the data of the zooming lens group are shown in FIG. 57, and the various data in the proximity object focusing state are shown in FIG. 58.

Table 1 below shows the values corresponding to the conditions with respect to the zoom lens systems of the numerical examples.

Values Corresponding to the Conditions:

TABLE 1

| | | Numerical Example | | | | | | |
|---|---|---|---|---|---|---|---|---|
| Condition | | 1 | 2 | 3 | 4 | 5 | 6 | 7 |
| (1) | (β1t/β1w) × (β2t/β2w) | 1.16 | 1.19 | 0.82 | 1.06 | 1.13 | 1.09 | 1.09 |
| (2) | |f1/f2| | 1.07 | 1.28 | 1.19 | 0.85 | 0.29 | 0.42 | 1.10 |
| (3) | vp2 | 23.8 | 23.8 | 23.8 | 70.3 | 24.1 | 19.0 | 81.61 |
| (4) | vp1 | 25.5 | 23.8 | 23.8 | 23.8 | | | 23.96 |
| (5) | mf2w/mf1w | 0.66 | 0.44 | 0.32 | 0.97 | 1.17 | 1.05 | 1.04 |
| | mf2t/mf1t | 0.33 | 0.35 | 0.22 | 0.01 | 0.00 | 0.00 | 1.07 |

A zoom lens system according to the present disclosure can be applied to a digital still camera, a digital video camera, a camera on a portable phone appliance, a camera on a PDA (Personal Digital Assistance), a surveillance camera of a surveillance system, a webcam, an on-vehicle camera, and the like, and in particular, is suitable for an imaging optical system which is used in a digital still camera system, a digital video camera system, and the like and in which high image quality is required.

Further, the zoom lens system according to the present disclosure can be applied to, among interchangeable lens devices according to the present disclosure, an interchangeable lens device which is equipped in a digital video camera system and has an electrically driven zoom function for motor driving a zoom lens system.

What is claimed is:
1. A zoom lens system including a plurality of lens groups each of which includes at least one lens element, the zoom lens system comprising, in order from an object side to an image side:
a front group including a first focusing lens group having a negative power; and
a rear group including a second focusing lens group having a positive power,
wherein when zooming is performed from a wide end to a telephoto end, the first focusing lens group and the second focusing lens group move along an optical axis,
when focusing is performed from an infinity focusing state to a proximity object focusing state, the first focusing lens group and the second focusing lens group move to perform the focusing, and
conditional expressions (1), (2), and (3) below are satisfied:

$$-20 < \beta 1t/\beta 1w \times \beta 2t/\beta 2w < 20 \quad (1)$$

$$0.25 < |f1/f2| < 1.30 \quad (2)$$

$$vp2 < 30 \quad (3)$$

where:
β1t is a lateral magnification of the first focusing lens group at the telephoto end;
β1w is a lateral magnification of the first focusing lens group at the wide end;
β2t is a lateral magnification of the second focusing lens group at the telephoto end;
β2w is a lateral magnification of the second focusing lens group at the wide end;
f1 is a focal length of the first focusing lens group;
f2 is a focal length of the second focusing lens group; and
vp2 is the Abbe number of a lens element which has the strongest positive power in the at least one lens element constituting the second focusing lens group.

2. The zoom lens system according to claim 1, further comprising
an aperture diaphragm,
wherein the first focusing lens group and the second focusing lens group are disposed on the image side of the aperture diaphragm.

3. The zoom lens system according to claim 1, wherein, when focusing is performed from the infinity focusing state to the proximity object focusing state, the first focusing lens group moves toward the image side along the optical axis and the second focusing lens group moves toward the object side along the optical axis.

4. The zoom lens system according to claim 1, wherein, when zooming is performed from the wide end to the telephoto end, the first focusing lens group moves along a locus convex toward the image side.

5. The zoom lens system according to claim 1, wherein, when zooming is performed from the wide end to the telephoto end, the second focusing lens group moves getting closer to an adjacent lens group on the image side.

6. The zoom lens system according to claim 1, wherein the second focusing lens group consists of one lens element having a positive power.

7. The zoom lens system according to claim 1, wherein the first focusing lens group has a single lens element having a positive power and a single lens element having a negative power, and satisfies conditional expression (4) below:

$$\nu p1 < 30 \quad (4)$$

where:
$\nu p1$ is the Abbe number of a lens element which has the strongest positive power in the lens elements constituting the first focusing lens group.

8. The zoom lens system according to claim 1, wherein the first focusing lens group includes a cemented lens made up of, in order from the object side to the image side:
a single lens element having a positive power; and
a single lens element having a negative power.

9. The zoom lens system according to claim 1, wherein conditional expression (5) below is satisfied:

$$mf2w/mf1w > mf2t/mf1t \quad (5)$$

where:
mf2w is an amount of movement of the second focusing lens group at the wide end when focusing is performed from the infinity focusing state to an object at any certain distance;
mf1w is an amount of movement of the first focusing lens group at the wide end when focusing is performed from the infinity focusing state to an object at the certain distance;
mf2t is an amount of movement of the second focusing lens group at the telephoto end when focusing is performed from the infinity focusing state to an object at the certain distance; and
mf1t is an amount of movement of the first focusing lens group at the telephoto end when focusing is performed from the infinity focusing state to an object at the certain distance.

10. The zoom lens system according to claim 1, wherein the front group includes a first lens group on the most object side, and the first lens group has a positive power.

11. The zoom lens system according to claim 1, wherein, when zooming is performed from the wide end to the telephoto end, the first lens group is fixed with respect to an image plane.

12. The zoom lens system according to claim 1, further comprising:
an aperture diaphragm, and
two lens groups between the first focusing lens group and the aperture diaphragm, the two lens groups moving along the optical axis when zooming is performed from the wide end to the telephoto end.

13. The zoom lens system according to claim 1, wherein the front group includes on the object side of the first focusing lens group, in order from the object side to the image side:
a first lens group having a positive power;
a second lens group having a negative power; and
a third lens group having a positive power.

14. The zoom lens system according to claim 13, wherein the third lens group consists of a single lens element having a positive power.

15. The zoom lens system according to claim 13, wherein a lens group which is adjacent to and on the object side of the first focusing lens group includes, in order from the object side to the image side:
a first sub-lens group having a positive power;
an aperture diaphragm;
a second sub-lens group having a negative power;
a third sub-lens group which has a positive power and performs image stabilization by moving in a direction perpendicular to the optical axis; and
a fourth sub-lens group having a positive power.

16. The zoom lens system according to claim 15, comprising, between the third sub-lens group and the fourth sub-lens group, a variable light aperture diaphragm which changes a diameter of the variable light aperture when zooming is performed from the wide end to the telephoto end.

17. The zoom lens system according to claim 15, wherein the third sub-lens group includes, in order from the object side to the image side:
a cemented lens made up of a lens element having a negative power and a lens element having a positive power; and
a single lens element having a positive power.

18. An interchangeable lens device comprising:
a zoom lens system including a plurality of lens groups each of which includes at least one lens element, the zoom lens system comprising, in order from an object side to an image side:
a front group including a first focusing lens group having a negative power; and
a rear group including a second focusing lens group having a positive power, wherein when zooming is performed from a wide end to a telephoto end, the first focusing lens group and the second focusing lens group move along an optical axis, and when focusing is performed from an infinity focusing state to a proximity object focusing state, the first focusing lens group and the second focusing lens group move to perform the focusing; and
a lens mount which is attachable to a camera body including an imaging element which receives an optical image formed by the zoom lens system and converts the optical image into an electric image signal,
wherein conditional expressions (1), (2), and (3) below are satisfied:

$$-20 < \beta 1t/\beta 1w \times \beta 2t/\beta 2w < 20 \quad (1)$$

$$0.25 < |f1/f2| < 1.30 \quad (2)$$

$$\nu p2 < 30 \quad (3)$$

where:
- $\beta 1t$ is a lateral magnification of the first focusing lens group at the telephoto end;
- $\beta 1w$ is a lateral magnification of the first focusing lens group at the wide end;
- $\beta 2t$ is a lateral magnification of the second focusing lens group at the telephoto end;
- $\beta 2w$ is a lateral magnification of the second focusing lens group at the wide end;
- f1 is a focal length of the first focusing lens group;
- f2 is a focal length of the second focusing lens group; and
- vp2 is the Abbe number of a lens element which has the strongest positive power in the at least one lens element constituting the second focusing lens group.

19. A camera system comprising:
an interchangeable lens device; and
a camera body,
wherein the interchangeable lens device includes:
- a zoom lens system including a plurality of lens groups each of which includes at least one lens element, the zoom lens system comprising, in order from an object side to an image side:
  - a front group including a first focusing lens group having a negative power; and
  - a rear group including a second focusing lens group having a positive power, wherein when zooming is performed from a wide end to a telephoto end, the first focusing lens group and the second focusing lens group move along an optical axis, and when focusing is performed from an infinity focusing state to a proximity object focusing state, the first focusing lens group and the second focusing lens group move to perform the focusing; and
- a lens mount which is attachable to the camera body, and wherein the camera body has a camera mount, and is detachably coupled to the interchangeable lens device via the camera mount and which includes an imaging element which receives an optical image formed by the zoom lens system and converts the optical image into an electric image signal, wherein conditional expressions (1), (2), and (3) below are satisfied:

$$-20 < \beta 1t/\beta 1w \times \beta 2t/\beta 2w < 20 \quad (1)$$

$$0.25 < |f1/f2| < 1.30 \quad (2)$$

$$vp2 < 30 \quad (3)$$

where:
- $\beta 1t$ is a lateral magnification of the first focusing lens group at the telephoto end;
- $\beta 1w$ is a lateral magnification of the first focusing lens group at the wide end;
- $\beta 2t$ is a lateral magnification of the second focusing lens group at the telephoto end;
- $\beta 2w$ is a lateral magnification of the second focusing lens group at the wide end;
- f1 is a focal length of the first focusing lens group;
- f2 is a focal length of the second focusing lens group; and
- vp2 is the Abbe number of a lens element which has the strongest positive power in the at least one lens element constituting the second focusing lens group.

* * * * *